(12) United States Patent
Hirata

(10) Patent No.: US 7,810,468 B2
(45) Date of Patent: Oct. 12, 2010

(54) CONTROLLER AND CONTROL SYSTEM FOR INTERNAL COMBUSTION ENGINE

(75) Inventor: Yasuo Hirata, Chita-gun (JP)

(73) Assignee: Denso Corporation, Kariya (JP)

( * ) Notice: Subject to any disclaimer, the term of this patent is extended or adjusted under 35 U.S.C. 154(b) by 336 days.

(21) Appl. No.: 12/119,852

(22) Filed: May 13, 2008

(65) Prior Publication Data

US 2008/0312805 A1 Dec. 18, 2008

(30) Foreign Application Priority Data

Jun. 13, 2007 (JP) ............................. 2007-156569
Jun. 13, 2007 (JP) ............................. 2007-156570

(51) Int. Cl.
*F02D 13/04* (2006.01)
*F02D 9/06* (2006.01)
(52) U.S. Cl. ....................... 123/321; 123/322; 123/345; 123/305; 701/105
(58) Field of Classification Search ................. 123/321, 123/322, 345–349, 305, 434, 478, 480, 683; 701/104, 105
See application file for complete search history.

(56) References Cited

U.S. PATENT DOCUMENTS

| 4,512,318 | A | * | 4/1985 | Ito et al. ..................... | 123/492 |
|---|---|---|---|---|---|
| 4,615,410 | A | * | 10/1986 | Hosaka ........................ | 180/197 |
| 5,305,723 | A | * | 4/1994 | Kadota ........................ | 123/479 |
| 5,813,386 | A | * | 9/1998 | Okada et al. ............ | 123/339.14 |
| 5,960,631 | A | * | 10/1999 | Hayashi ........................ | 60/602 |
| 6,145,489 | A | * | 11/2000 | Kazama et al. ............. | 123/295 |
| 6,283,089 | B1 | * | 9/2001 | Fuwa et al. .................. | 123/295 |
| 6,868,327 | B2 | * | 3/2005 | Muto ........................ | 701/103 |
| 7,630,824 | B2 | * | 12/2009 | Hirata ........................ | 701/105 |

FOREIGN PATENT DOCUMENTS

| JP | 4-63942 | 2/1992 |
|---|---|---|
| JP | 2006-183500 | 7/2006 |

* cited by examiner

*Primary Examiner*—John T Kwon
(74) *Attorney, Agent, or Firm*—Nixon & Vanderhye, PC

(57) ABSTRACT

A requested injection time InjT that is necessary for a fuel injector to inject a fuel per one combustion cycle is computed in response to variables of an accelerator manipulated by a driver. An injectable time InjMax per one combustion cycle is computed on the basis of an engine speed, and whether the requested injection time InjT is larger than the injectable time InjMax is determined. Then, when it is positively determined that the requested injection time InjT is larger than the injectable time InjMax, the fuel pump is subjected to load-up operation so as to increase a fuel feed pressure.

6 Claims, 13 Drawing Sheets

ENGINE SPEED: NE

INJECTION PERIOD

THROTTLE
OPENING DEGREE

CONTROLLER AND CONTROL SYSTEM FOR INTERNAL COMBUSTION ENGINE

CROSS-REFERENCE TO RELATED APPLICATION

This application is based on Japanese Patent Applications No. 2007-156569 filed on Jun. 13, 2007 and No. 2007-156570 filed on Jun. 13, 2007, the disclosures of which are incorporated herein by reference.

FIELD OF THE INVENTION

The present invention relates to an internal combustion engine controller and an internal combustion engine control system to control the operational state of an internal combustion engine.

BACKGROUND OF THE INVENTION

As shown in JP-2006-183500A, a requested injection time that is necessary for a fuel injector to inject a fuel per one combustion cycle in an internal combustion engine is computed in response to the variables of an accelerator manipulated by a driver. The fuel injector is operated so as to keep the requested injection time and thereby a fuel of a quantity corresponding to an accelerator stroke is injected. In a spark ignition type internal combustion engine such as a gasoline engine for example, a requested intake air flow rate is computed in accordance with an accelerator stroke and a requested injection time is computed so that an air-fuel ratio most suitable for the requested intake air flow rate may be obtained.

Alcohol fuel is known as an alternate fuel for gasoline and light diesel oil (hereunder referred to as a regular fuel). When an alternate fuel is fed into a fuel tank in the state where a regular fuel remains therein to produce a composite fuel, the composite fuel is injected from the fuel injector and on this occasion the following problems arise.

It is known that, if it is attempted to obtain an excess air ratio equal to gasoline with an alcohol fuel for example, a larger amount of fuel injection than gasoline (for example about 1.6 times) is required. That is, with regard to the output torque of an internal combustion engine obtained by fuel injection for a certain period of time, the output torque obtained in the case of the injection of a composite fuel formed by blending alcohol with gasoline is smaller than that in the case of the injection of a fuel containing gasoline by 100%. Consequently, the injection time of a composite fuel must be longer than that of 100% gasoline.

The aforementioned requested injection time per one combustion cycle may exceeds the time allowing injection per one combustion cycle (720° CA) (an injectable time). In the operational region of a high output shaft rotation speed of an internal combustion engine in particular, the time required for one combustion cycle shortens, thus the injectable time also shortens, and resultantly the operation is likely to fall into the state where the requested injection time exceeds the injectable time.

When the requested injection time exceeds the injectable time, the air-fuel ratio deviates from an optimum value toward the side of a lean air-fuel ratio. In the case where the internal combustion engine is a gasoline engine in particular, if lean combustion occurs due to a lean air-fuel ratio, the combustion state is destabilized, thereby the amounts of HC and $O_2$ flowing into a catalyst device increase, the HC and $O_2$ are combusted in the catalyst device, and resultantly the temperature of the catalyst device rises and the catalyst device deteriorates.

SUMMARY OF THE INVENTION

The present invention has been established in order to solve the aforementioned problems and an object of the present invention is to provide an internal combustion engine controller and an internal combustion engine control system that can suppress such a drawback in which an air-fuel ratio deviates from an optimum value toward the side of a lean air-fuel ratio when an alternate fuel is blended with a regular fuel.

A controller according to the present invention includes a requested injection time computation means to compute a requested injection time that is necessary for a fuel injector to inject a fuel per one combustion cycle in response to variables of an accelerator manipulated by a driver. The controller includes an injectable time computation means to compute an injectable time per one combustion cycle on the basis of a rotation speed of the output shaft of an internal combustion engine, a determination means to determined whether the requested injection time is greater than the injectable time. The controller further includes a fuel pump control means to control the operation of a fuel pump to feed a fuel to the fuel injector. The fuel pump control means subjects the fuel pump to load-up operation so as to raise the feed pressure of the fuel when the determination means positively determines that the requested injection time is greater than the injectable time.

When it is positively determined that the requested injection time is larger than the injectable time) the fuel pump is subjected to load-up operation so that the fuel feed pressure may increase. Consequently, the quantity of a fuel injected from the fuel injector per unit time increases and hence the quantity of a fuel injected during the injectable time also increases even when the injectable time is not changed. As a result, it is possible to reduce the frequency of the undesirable cases where a fuel of a quantity that gives an optimum air-fuel ratio conforming to a requested intake air flow rate responding to an accelerator stroke can no more be injected as the quantity of an alternate fuel blended with a regular fuel increases. Further it is possible to suppress the drawback in which the air-fuel ratio deviates from the optimum value toward the side of a lean air-fuel ratio.

A controller according to the present invention is provided with: a requested opening degree computation means to compute the requested opening degree of an is intake air flow rate control valve on the basis of a requested intake air flow rate responding to the variables of an accelerator manipulated by a driver; a requested injection time computation means to compute a requested injection time that is necessary for a fuel injector to inject a fuel per one combustion cycle, an injectable time computation means to compute an injectable time per one combustion cycle on the basis of a rotation speed of the output shaft of an internal combustion engine; a determination means to determine whether the requested injection time is larger than the injectable time; and an opening degree correction means to subtractively correct the requested opening degree when the determination means determines that the requested injection time is greater than the injectable time.

When it is determined that the requested injection time is greater than the injectable time, the requested opening degree of the intake air flow rate control valve is subtractively corrected so as to be smaller. Consequently, the actual intake air flow rate decreases to a level lower than the requested intake air flow rate computed in accordance with an accelerator stroke. As a result, it is possible to prevent an air-fuel ratio from deviating from the optimum value toward the side of a lean air-fuel ratio even in the undesirable cases where a fuel of a quantity that gives an optimum air-fuel ratio conforming to a requested intake air flow rate responding to an accelerator stroke can not be injected.

In recent years, the mechanism of driving an intake valve with an electromagnetic actuator has been developed. In this case it is possible to regulate an intake air flow rate by controlling the movement of the intake valve. An "intake air flow rate control valve" according to the present invention is not limited to a throttle valve that is attached to an intake pipe and adjusts an intake air flow rate, but includes such an intake valve driven by an electromagnetic actuator.

A controller according to the present invention is provided with: a requested injection time computation means to compute a requested injection time that is necessary for a fuel injector to inject a fuel per one combustion cycle in response to variables of an accelerator manipulated by a driver; an overrun control means to lower the output of an internal combustion engine when the rotation speed of the output shaft of the internal combustion engine exceeds an upper limit; an injectable time computation means to compute an injectable time per one combustion cycle on the basis of a rotation speed of the output shaft; a determination means to determine whether the requested injection time is greater than the injectable time; and an upper limit correction means to subtractively correct the upper limit when the determination means positively determines that the requested injection time is larger than the injectable time.

When it is positively determined that the requested injection time is greater than the injectable time, the upper limit is subtractively corrected so as to be smaller. Consequently, the frequency of the cases where an engine speed comes to such a high rotation speed as exceeding the upper limit can be decreased. Hence the frequency of the cases where the injectable time is shorter than the requested injection time is also decreased, and the frequency of positive determination can be suppressed. As a result, it is possible to prevent an air-fuel ratio from deviating from the optimum value toward the side of a lean air-fuel ratio even in the undesirable cases where a fuel of a quantity that gives an optimum air-fuel ratio conforming to a requested intake air flow rate responding to an accelerator stroke can not be injected.

BRIEF DESCRIPTION OF THE DRAWINGS

Other objects, features and advantages of the present invention will become more apparent from the following detailed description made with reference to the accompanying drawings, in which like parts are designated by like reference numbers.

DETAILED DESCRIPTION OF THE PREFERRED EMBODIMENTS

Embodiments according to the present invention are hereunder explained in reference to drawings.

First Embodiment

In the present embodiment, an internal combustion engine control system is configured with a vehicle-mounted multiple cylinder gasoline engine and, in the control system, the control of a fuel injection quantity and the control of ignition timing are carried out mainly with an electronic control unit (hereunder referred to as an ECU) functioning as an internal combustion engine controller. Firstly, a general configuration diagram of an internal combustion engine control system is explained in reference to FIG. 1.

Figure 1:
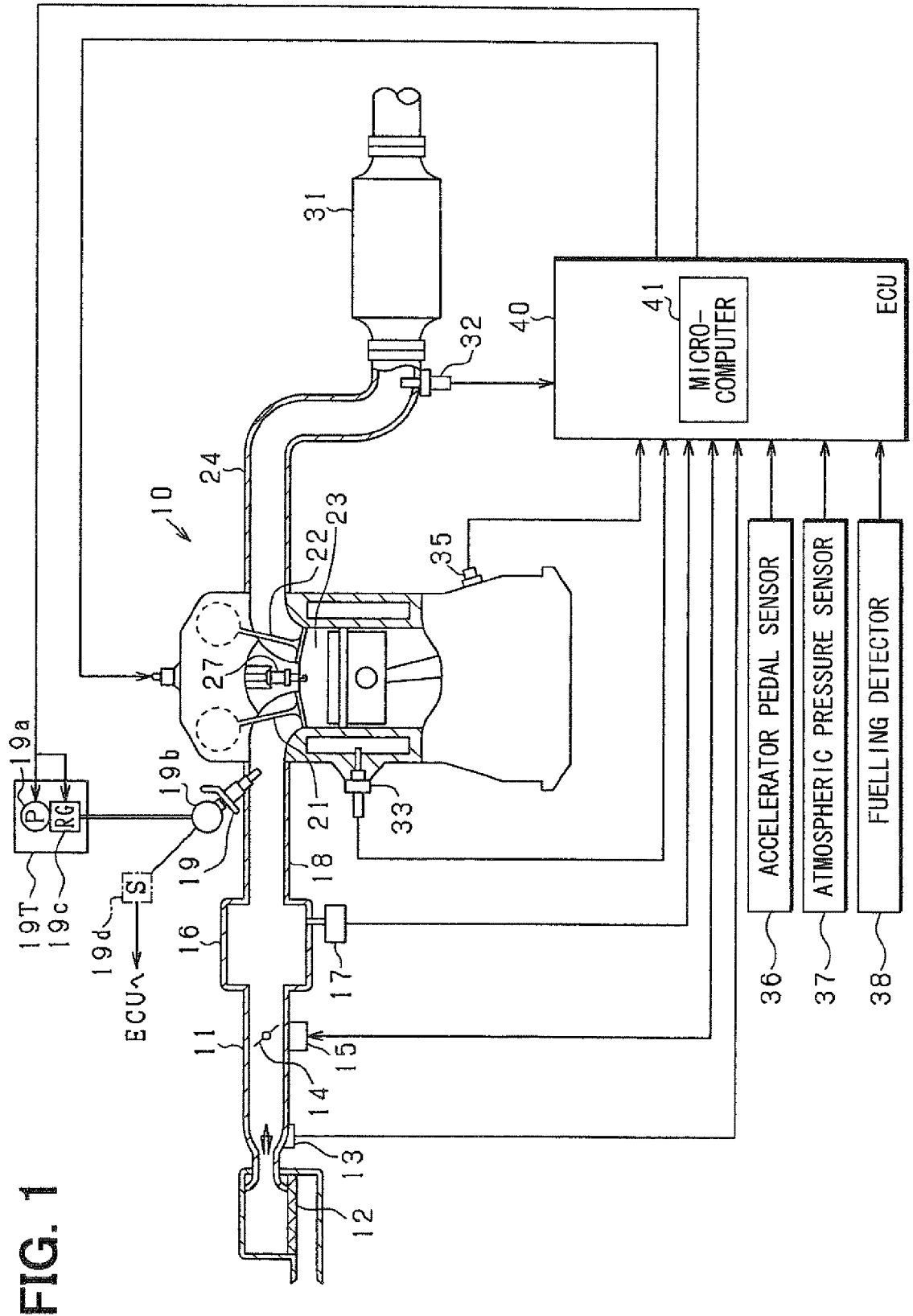
FIG. 1 is a general configuration view showing an internal combustion engine control system according to a first embodiment.

In an engine 10 shown in FIG. 1, an air cleaner 12 is disposed on the uppermost stream side of an intake pipe 11 and an air flow meter 13 to detect an intake air flow rate is disposed on the downstream side of the air cleaner 12. On the downstream side of the air flow meter 13, a throttle valve 14 (an intake air flow rate control valve) the degree of opening of which is adjusted with a throttle actuator 15 comprising a DC motor or the like is disposed. The opening degree of the throttle valve 14 (a throttle opening degree) is detected by a throttle position sensor incorporated in the throttle actuator 15. Although the structure is configured so that a throttle valve 14 may be disposed for a plurality of cylinders in the present embodiment, it is also possible to configure the structure so that a throttle valve 14 may be disposed for each cylinder and in this case the intake air flow rate in each combustion chamber 23 may be independently controlled.

A surge tank 16 is disposed on the downstream side of the throttle valve 14 and an intake air pressure sensor 17 to detect an intake pipe pressure is attached to the surge tank 16. Further, an intake manifold 18 to introduce air into each cylinder of the engine 10 is connected to the surge tank 16 and a fuel injector 19 of an electromagnetically driven type to inject a fuel is disposed in the vicinity of the intake port of each cylinder in the intake manifold 18.

An electrically driven fuel pump 19a is disposed in a fuel feed channel extending from a fuel tank 19T to the fuel injector 19. The fuel pump 19a according to the present embodiment is of an in-tank type and is disposed in the fuel tank 19T, and the fuel in the fuel tank 19T is supplied to a delivery pipe 19b by the fuel pump 19a and distributed from the delivery pipe 19b to each fuel injector 19.

An intake valve 21 and an exhaust valve 22 are disposed at the intake port and the exhaust port of the engine 10 respectively. A mixed gas of air and the fuel is introduced into a combustion chamber 23 through the intake valve 21 and an exhaust gas after combusted is discharged to an exhaust pipe 24 (an exhaust channel) through the exhaust valve 22.

An ignition plug 27 is attached to the cylinder head of each cylinder in the engine 10 and high voltage is applied to the ignition plug 27 at a desired ignition time through an ignition device (not shown) comprising ignition coils and others. By applying high voltage, spark discharge occurs between the opposing electrodes of each ignition plug 27 and the mixed gas introduced into the combustion chamber 23 is ignited and combusted.

A catalyst 31 such as a three-way catalyst to purify CO, HC, NOx, and others in an exhaust gas is attached to the exhaust pipe 24 and, on the upstream side of the catalyst 31, an A/F sensor 32 to detect an air-fuel ratio (an oxygen concentration) of a mixed gas in the exhaust gas is disposed.

Further, a coolant temperature sensor 33 to detect a coolant temperature and a crank angle sensor 35 to output a rectangular-shaped crank angle signal for every prescribed crank angle (for example at 30° CA cycle) of an engine are attached to the cylinder block of the engine 10. In addition, in the present control system, an accelerator pedal sensor 36 to detect the variable of an accelerator manipulated by a driver (an accelerator pedal stroke) and an atmospheric pressure sensor 37 to detect the atmospheric pressure are disposed.

An ECU 40: is, as is well known, structured by having a microcomputer 41 comprising CPU, ROM, RAM, EEPROM, and others as the main component. The ECU 40 executes various kinds of control programs stored in a ROM, thereby controls the engine 10 variously in accordance with an engine operation state. That is, various detection signals are input to the microcomputer 41 of the ECU 40 from the aforementioned various kinds of the sensors. Then the microcomputer 41: computes a fuel injection quantity, an ignition timing, a throttle opening degree, and others on the basis of the various kinds of the detection signals; and controls the drive of the fuel injector 19, the ignition device, and the throttle actuator 15. The microcomputer 41 sets a target air-fuel ratio on the basis of an engine operation state and executes air-fuel ratio feedback control so that the actual air-fuel ratio detected by the A/F sensor 32 may coincide with the target air-fuel ratio.

The ECU 40 controls the operation of the fuel pump 19a. The duty ratio of the on/off control of the fuel pump 19a is fixed to a predetermined value in the ordinary case where load-up operation is not adopted. Then, when the discharge pressure of the fuel discharged from the fuel pump 19a exceeds a threshold value, the pressure regulator 19c is activated and thereby the fuel is brought back into the fuel tank 19T. Consequently, the pressure of the fuel in the delivery pipe 19b is maintained at a prescribed value within the range not exceeding the threshold value.

The fuel pump 19a is of an in-tank type and, since the pressure regulator 19c is placed in the fuel tank 19T, the fuel of a discharge pressure exceeding the threshold value is never supplied to the delivery pipe 19b. That is, a returnless type is adopted.

In the case where a composite fuel of alcohol fuel and gasoline in the fuel tank 19T is injected through the fuel injector 19, a more fuel injection quantity is required than the case of gasoline. In the present embodiment, it is attempted to well conform to the change from the state of 100% gasoline to a state of blending an alcohol fuel.

Figure 2:
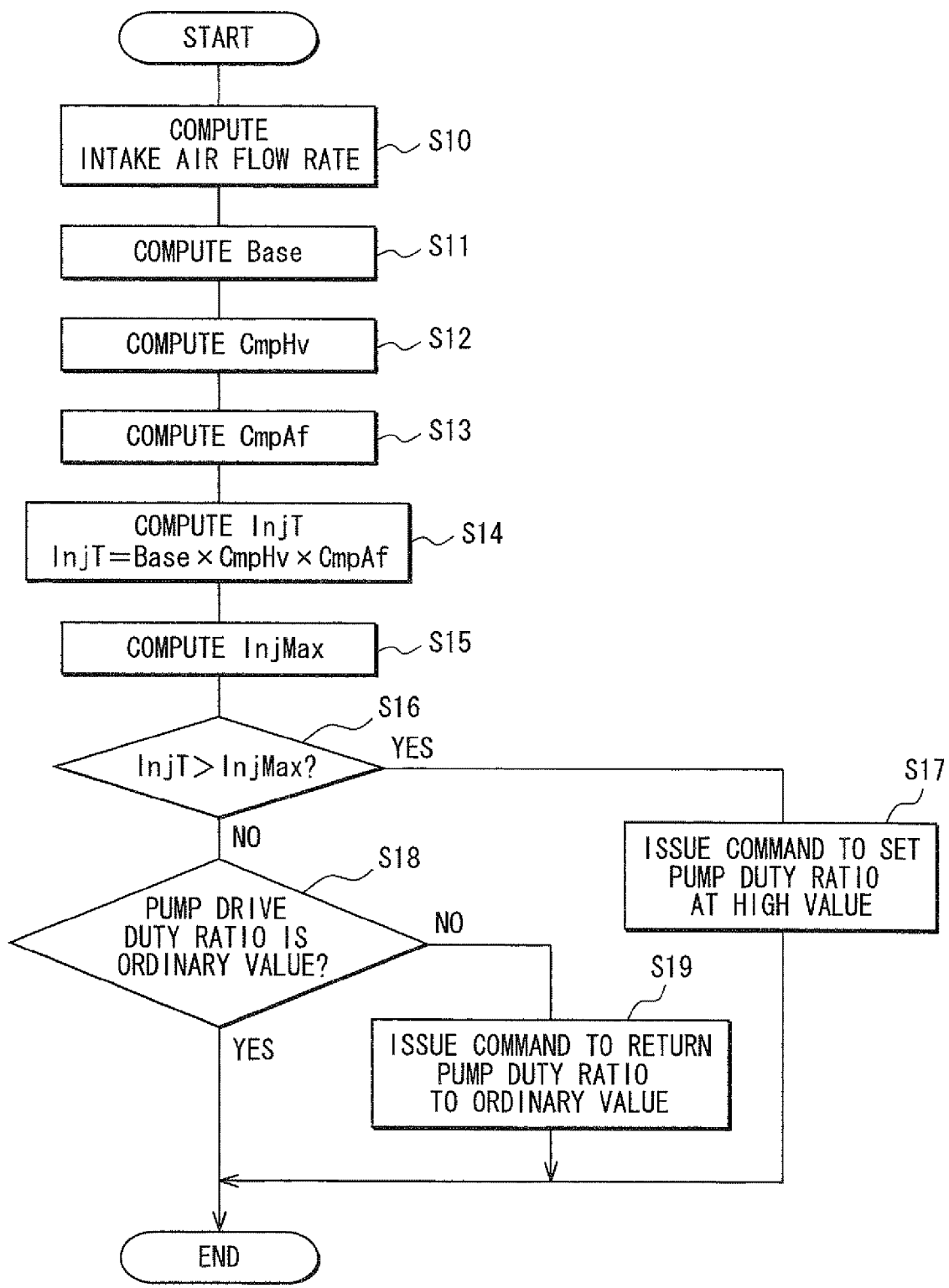
FIG. 2 is a flowchart showing the control procedure executed by an ECU.
Figure 3:
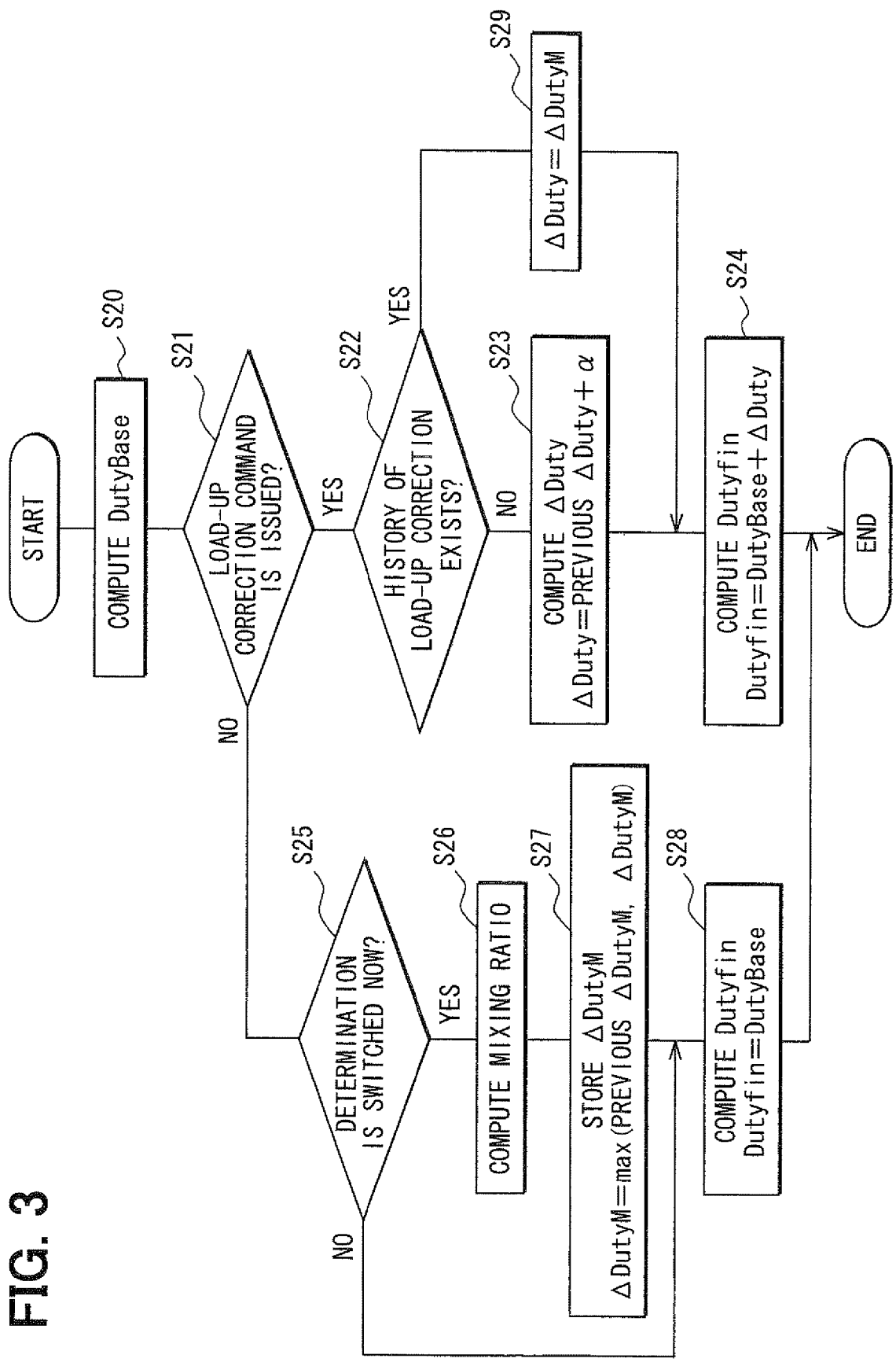
FIG. 3 is a flowchart showing a pump control routine.

The control procedure of the fuel pump 19a with the ECU 40 is hereunder explained in reference to the flowcharts shown in FIGS. 2 and 3. The procedure is repeated on a prescribed cycle (for example 10 msec cycle).

At Step S10 in FIG. 2, an actual intake air flow rate is computed on the basis of a value measured by the air flow meter 13. Successively at Step S11, a basic fuel time Base per cylinder is computed on the basis of the computed intake air flow rate.

The basic fuel time Base is computed so that the value may increase as the intake air flow rate increases.

At Step S12, a fuel increment CmpHv is computed on the basis of: an engine speed computed on the basis of signals output from the crank angle sensor 35; and an intake air pressure computed on the basis of a value measured by the intake air pressure sensor 17. The fuel increment CmpHv is computed so as to increase as the engine speed and the intake air pressure increase.

At Step S13, a fuel correction value CmpAf is computed on the basis of the deviation (an actual air-fuel ratio minus a target air-fuel ratio) between an actual is air-fuel ratio computed on the basis of a value measured with the A/F sensor 32 and a target air-fuel ratio. The fuel correction value CmpAf is computed so as to be a larger value as the deviation increases and is a correction value used for bringing an actual air-fuel ratio close to a target air-fuel ratio.

At Step S14, a requested injection time InjT of a fuel injected per one cylinder is computed on the basis of the following computation formula;

$$InjT = \text{Basic fuel time Base} \times \text{Fuel increment } CmpHv \times \text{Fuel correction value } CmpAf.$$

By opening the fuel injector 19 for a requested injection time InjT, the pressure in the delivery pipe 19b is maintained at a prescribed value and hence a fuel in the quantity responding to the requested injection time InjT is injected from the fuel injector 19. Then the basic fuel time Base is computed at Step S11 on the premise that a fuel in the quantity responding to the requested injection time InjT is injected in one combustion cycle.

At Step S15, a maximum injectable time InjMax is computed on the basis of an engine speed. In the present embodiment, 700° CA in one combustion cycle of 720° CA is set as the maximum injectable crank angle and the time spent while a crank shaft rotates by 700° CA is the maximum injectable time InjMax.

At Step S16, whether the requested injection time InjT is larger than the injectable time InjMax is determined. If it is positively determined that InjT is larger than InjMax, the injection quantity is in an insufficient state and it is concerned that the actual air-fuel ratio deviates from the target air-fuel ratio toward the side of a lean air-fuel ratio. In order to avoid the concern, when the positive determination is made (YES at Step S16), the procedure proceeds to Step S17 and the fuel pump 19a is subjected to load-up operation so as to increase the fuel pressure in the delivery pipe 19b.

The duty ratio of on/off control of the fuel pump 19a is to be raised in order to increase the fuel pressure in the delivery pipe 19b. At Step S17, correction command is issued so as to set the pump drive duty ratio at a high value conforming to load-up operation. More specifically, a flag of load-up correction command is placed. Then, when such load-up correction command is issued, the duty ratio increases in the pump control routine shown in FIG. 3.

At Step S16, when negative determination is made, the procedure proceeds to Step S18 in which it is determined whether the pump drive duty ratio is an ordinary value. When it is determined that the pump drive duty ratio is not an ordinary value (NO at Step S18), correction command is issued so as to bring the pump drive duty ratio back from the high value to the ordinary value at the succeeding Step S19. More specifically, a flag of ordinary value correction command is placed.

FIG. 3 is a flowchart showing the procedure of pump control to compute a control value output from the ECU 40 to the fuel pump 19a. At Step S20, the basic duty ratio DutyBase of the fuel pump 19a is computed. Successively at Step S21, it is determined whether the load-up correction command at Step S17 is issued on the basis of the flag.

When it is determined that the load-up correction command is issued, whether the history of the load-up correction exists is determined at the succeeding Step S22. If it is determined that the history of the load-up correction does not exist, the duty ratio increment ΔDuty is computed on the basis of the following computation formula at Step S23;

ΔDuty=Previous ΔDuty+α wherein, the value of α is fixed to a predetermined value.

At Step S24, a final control value Dutyfin output from the ECU 40 to the fuel pump 19a is computed on the basis of the following computation formula;

Dutyfin=Basic duty ratio DutyBase+Increment Δduty

When it is determined that the load-up correction command is not issued, the procedure proceeds to Step S25 and whether the determination at Step S21 is now switched from positive determination to negative determination is determined. If it is determined that the determination is now switched, the mixing ratio that is the ratio of gasoline to an alcohol fuel is computed with the graphs shown in FIGS. 4A and 4B at Step S26.

Figure 4A:
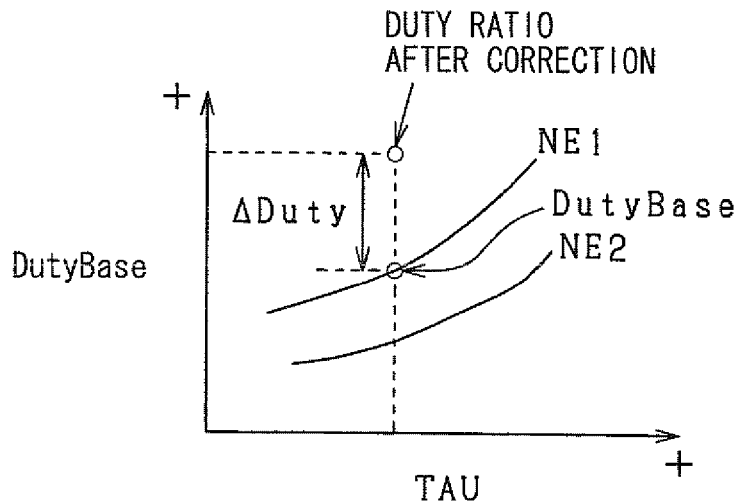
FIGS. 4A to 4C are graphs used in the computation of a mixing ratio.
Figure 4B:
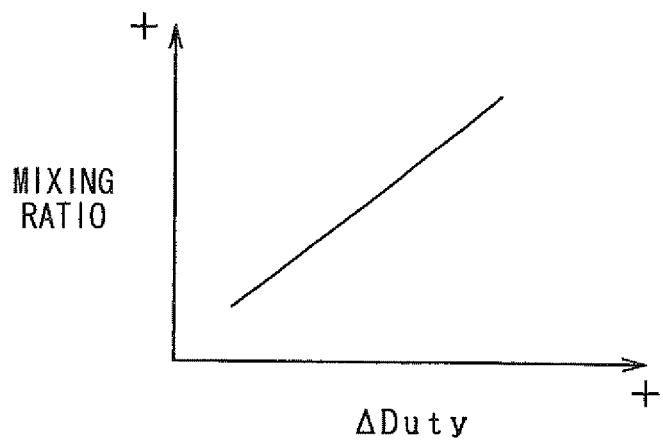

The solid lines in FIG. 4A show the relationship between a fuel injection quantity TAU actually injected from the fuel injector 19 and a basic duty ratio DutyBase. The relationship between the injection quantity TAU and the basic duty ratio DutyBase is graphically shown in response to an engine speed. Then at Step S26, the deviation ΔDuty between a control value Dutyfin that is a duty ratio after correction and the basic duty ratio DutyBase is computed with the graph in FIG. 4A. Then a mixing ratio is computed on the basis of the deviation ΔDuty with the graph in is FIG. 4B showing the relationship between the deviation ΔDuty and the mixing ratio.

Figure 4C:
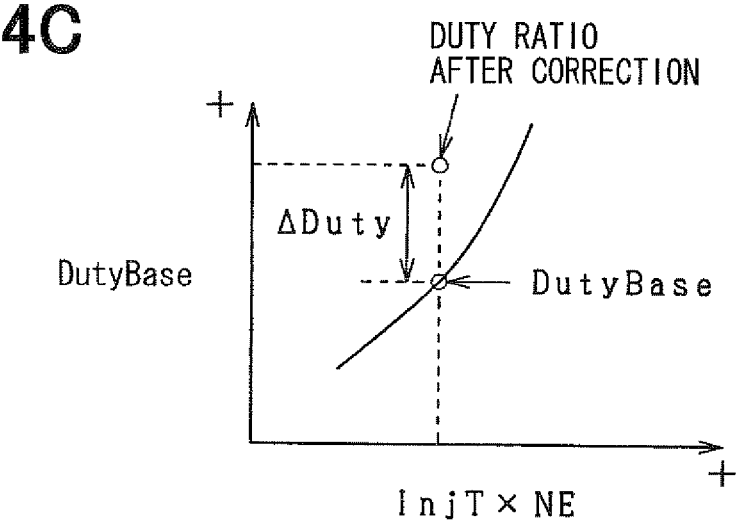

A mixing ratio may be computed with the graph shown in FIG. 4C in place of the graph shown in FIG. 4A. FIG. 4C is a graph showing the relationship between a value obtained by multiplying a requested injection time InjT by an engine speed NE and a basic duty ratio DutyBase. The deviation ΔDuty for use in FIG. 4B can be obtained with the graph in the same way as the case of FIG. 4A.

At Step S27, the deviation ΔDuty and the previous deviation ΔDuty are compared with each other and the larger value of them is stored in a backup RAM as a history deviation ΔDutyM. The history deviation ΔDutyM thus stored is erased when an ignition switch is turned off. Otherwise, the history deviation ΔDutyM may be set so as to be erased when a fuel is fed to the fuel tank 19T. Still otherwise, a history correction quantity ΔTHM may be stored and maintained without being erased.

Whether or not a fuel is supplied may be determined on the basis of signals output from a detector 38 to detect the opening and closing of a refueling cap (refer to FIG. 1) or signals output from a detector to detect the residual quantity of the fuel in the fuel tank. In other words, the memory of the history is maintained until the signals output from the detector (canceling signals) are obtained.

At Step S28, the final control value Dutyfin output from the ECU 40 to the fuel pump 19a is used as the basic duty ratio DutyBase. If it is determined that the determination is not switched now at Step S25 (NO in Step S25), the procedure proceeds to Step S28 without the computation of the mixing ratio at Step S26 and the process of adopting the control value Dutyfin as the basic duty ratio DutyBase is executed.

When the history is stored at Step S27, it is determined that the history of load-up correction exists at Step S22 and on this occasion the stored history deviation ΔDutyM is set as the increment ΔDuty at Step S29. That is, when the determination is once switched from the determination that load-up correction exists to the determination that load-up correction command does not exist (YES at Step S25), the history deviation ΔDutyM at the time is computed and stored. When the load-up correction command exists afterward (YES at Step S22), the basic duty ratio DutyBase is increased by the stored history deviation ΔDutyM without the computation of the increment ΔDuty (Step S24).

Figure 5A:
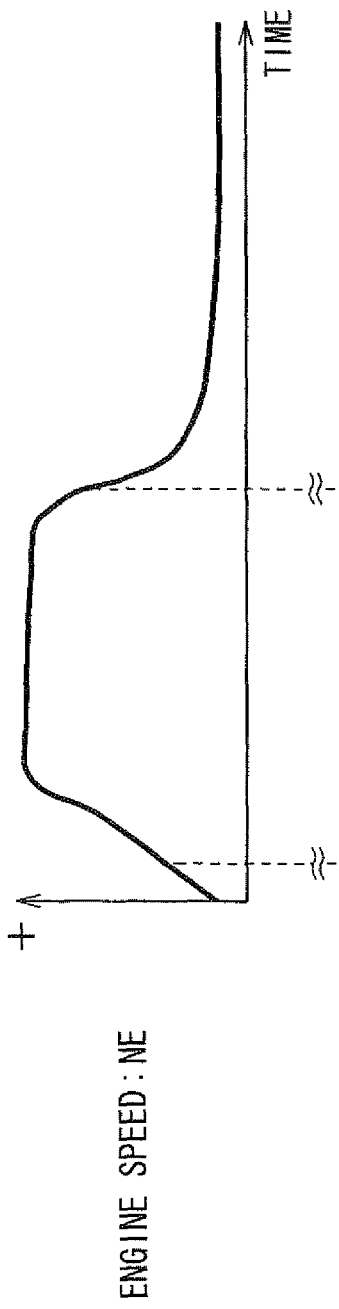
FIGS. 5A to 5C are timing charts showing an embodiment according to the procedure shown in FIGS. 2 and 3.
Figure 5B:
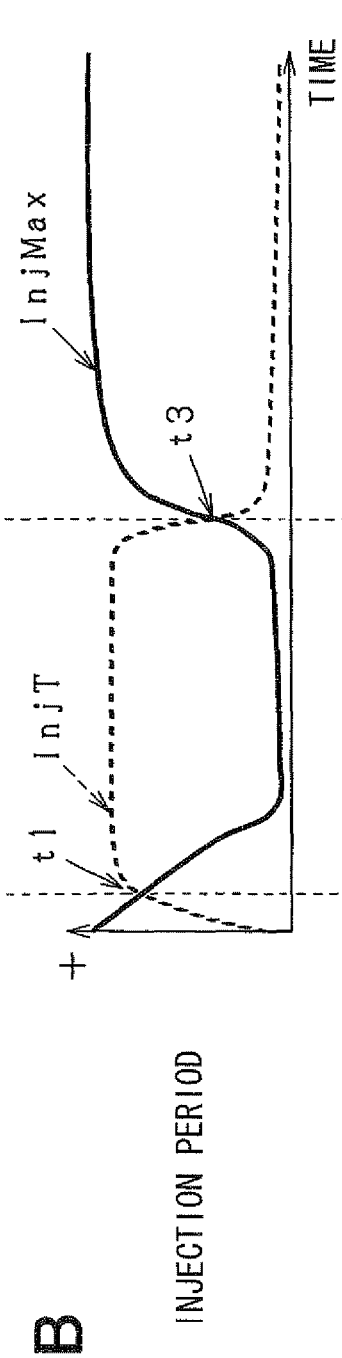
Figure 5C:
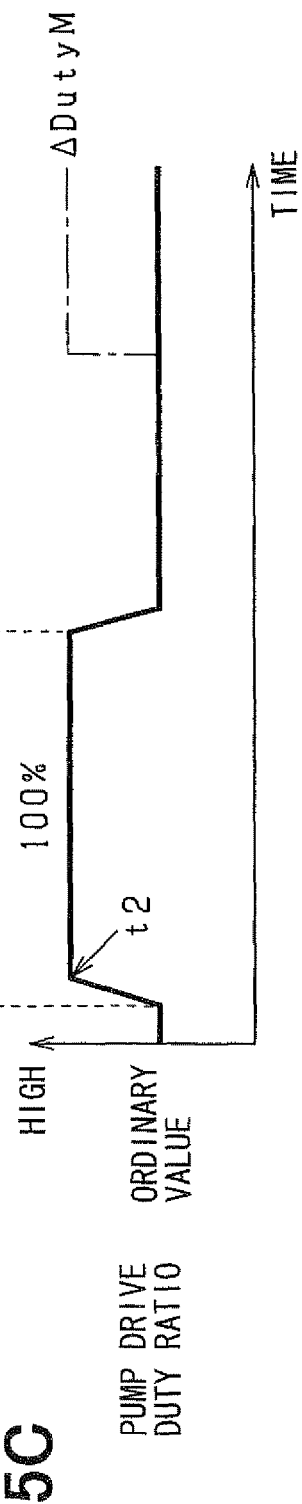

An embodiment in the case where the drive of the fuel pump 19a is controlled on the basis of the determination at Step S16 is shown in FIGS. 5A-5B. FIG. 5A shows the change of the engine speed NE computed on the basis of signals output from the crank angle sensor 35. In FIG. 5B, the solid line shows the change of the maximum injectable time InjMax and the dotted line shows the change of the requested injection time InjT per one cylinder when an alcohol fuel is not blended. FIG. 5C shows the change of the pump drive duty ratio responding to a control value Dutyfin.

As shown in FIGS. 5A-5C, the maximum injectable time InjMax lowers as the engine speed increases due to the increase of the accelerator stroke or the like; and increases as the engine speed decreases. Then, when the maximum injectable time InjMax lowers as the engine speed increases and the time t1 comes, the requested injection time InjT comes to be larger than the maximum injectable time InjMax because an alcohol fuel is blended with gasoline.

At the time of t1, the determination at Step S16 shifts from negative determination to positive determination. Then, as long as the state of the positive determination continues, the control value Dutyfin increases gradually every time by the value α and the pump drive duty ratio increases gradually from the ordinary value. Thereafter, the value is maintained after the time t2 when the pump drive duty ratio reaches 100%.

Thereafter, when the maximum injectable time InjMax increases as the engine speed lowers due to the decrease of the accelerator stroke and the time t3 comes, the requested injection time InjT comes to be smaller than the maximum injectable time InjMax. That is, the state where a fuel of the quantity corresponding to the requested injection time InjT can be injected is obtained. At the time of t3, the determination at Step S16 shifts from positive determination to negative determination. Then the pump drive duty ratio returns to the ordinary value from 100% in the process at Step S19.

Successively, when the requested injection time InjT exceeds the maximum injectable time InjMax again, as shown with the dashed-dotted line in FIG. 5C, the pump drive duty ratio increases again so as to take the value of the stored history deviation ΔDutyM.

The following excellent advantages are obtained in the present embodiment described above.

(1) When the requested injection time InjT exceeds the maximum injectable time InjMax because an alcohol fuel is blended with gasoline, load-up operation wherein the drive duty ratio of the fuel pump 19a is increased is adopted. Consequently, since the fuel pressure in the delivery pipe 19b increases and the fuel quantity injected per unit time from the fuel injector 19 also increases, the fuel quantity injected during the injectable time increases even when the maximum injectable time InjMax is not changed. As a result, it is possible to reduce the frequency of the undesirable cases where a fuel of a quantity that gives an optimum air-fuel ratio to a requested intake air flow rate responding to the accelerator stroke (a fuel quantity corresponding to the requested injection time InjT) can more hardly be injected as the quantity of an alcohol fuel blended with gasoline increases. It is restricted that the air-fuel ratio deviates from the optimum value toward the side of a lean air-fuel ratio.

(2) In the case of lean burn combustion, because the combustion state is destabilized, it is concerned that HC and $O_2$ flowing in the catalyst 31 increase and are combusted in the vicinity of the catalyst 31 and resultantly the temperature of the so catalyst 31 rises and the catalyst 31 deteriorates. In contrast, in the present embodiment, the air-fuel ratio is prevented from deviating toward the side of the lean air-fuel ratio as stated above and hence the above concern can be avoided.

(3) During the time period when the requested injection time InjT exceeds the maximum injectable time InjMax (t1 to t3), the load-up operation of the fuel pump 19a continues and hence the air-fuel ratio can come close to the target air-fuel ratio (for example a stoichiometric air-fuel ratio).

(4) The mixing ratio that is the ratio of gasoline to an alcohol fuel is computed on the basis of the history deviation ΔDutyM that is the maximum value of the increment ΔDuty (the load-up quantity) of the duty ratio of the fuel pump 19a. Consequently, it is possible to compute (estimate) the mixing ratio of the gasoline to the alcohol fuel without an alcohol concentration sensor to detect the concentration of an alcohol fuel or the like. The mixing ratio can be estimated as a specific value with graphs when the duty ratio is less than 100%. When the duty ratio exceeds 100%, the alcohol concentration may be estimated to be a concentration not less than the alcohol concentration when the duty ratio is equal to 100%.

Second Embodiment

Whereas load-up operation is executed by increasing the drive duty ratio of the fuel pump 19a in the aforementioned first embodiment, in the present embodiment a configuration for feedback control is adopted so that the fuel pressure in the delivery pipe 19b (feed pressure) may take a target pressure (a target fuel pressure) and the load-up operation is executed by increasing the target fuel pressure.

Figure 6:
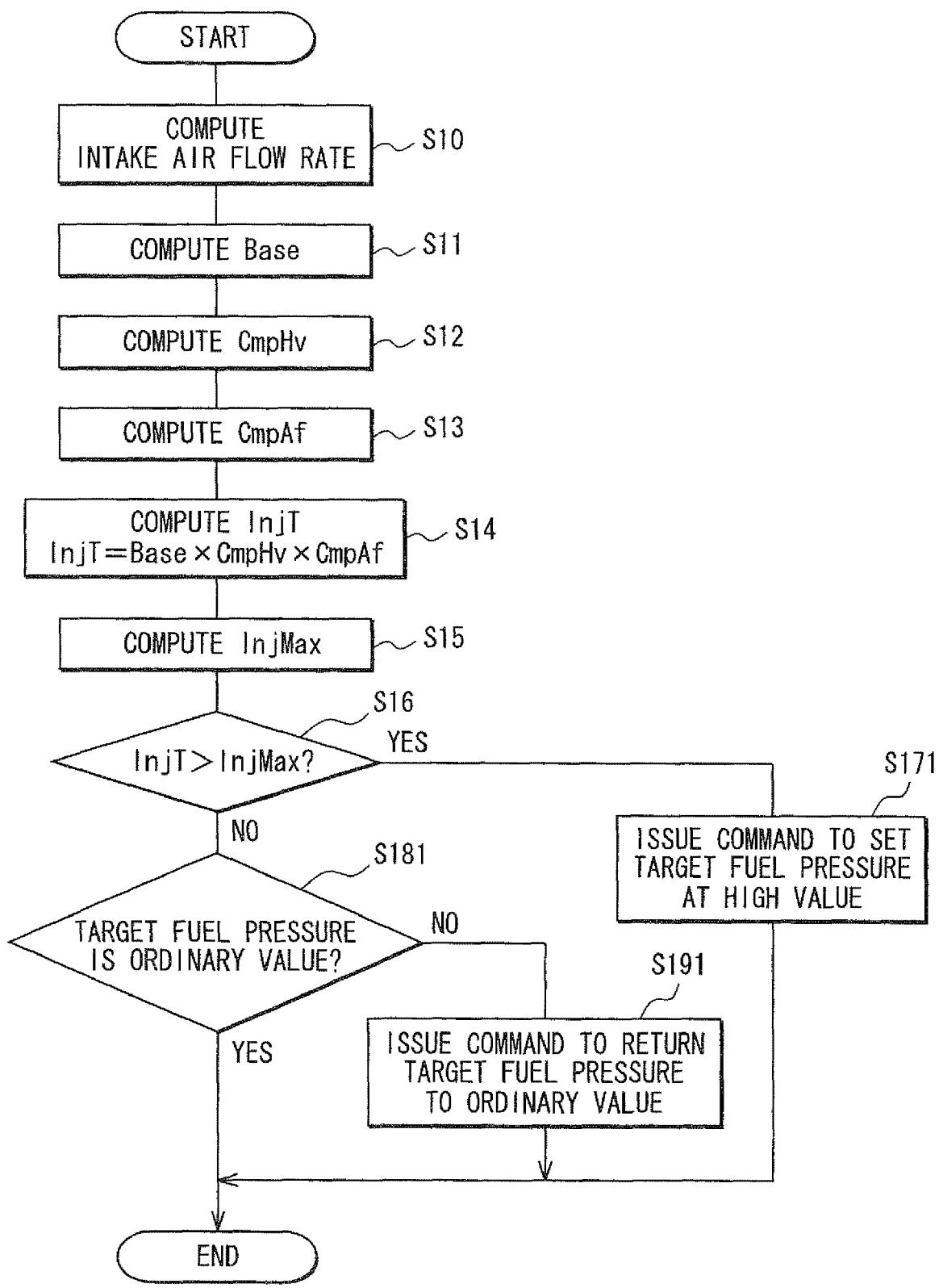
FIG. 6 is a flowchart showing the control procedure according to a second embodiment.
Figure 7:
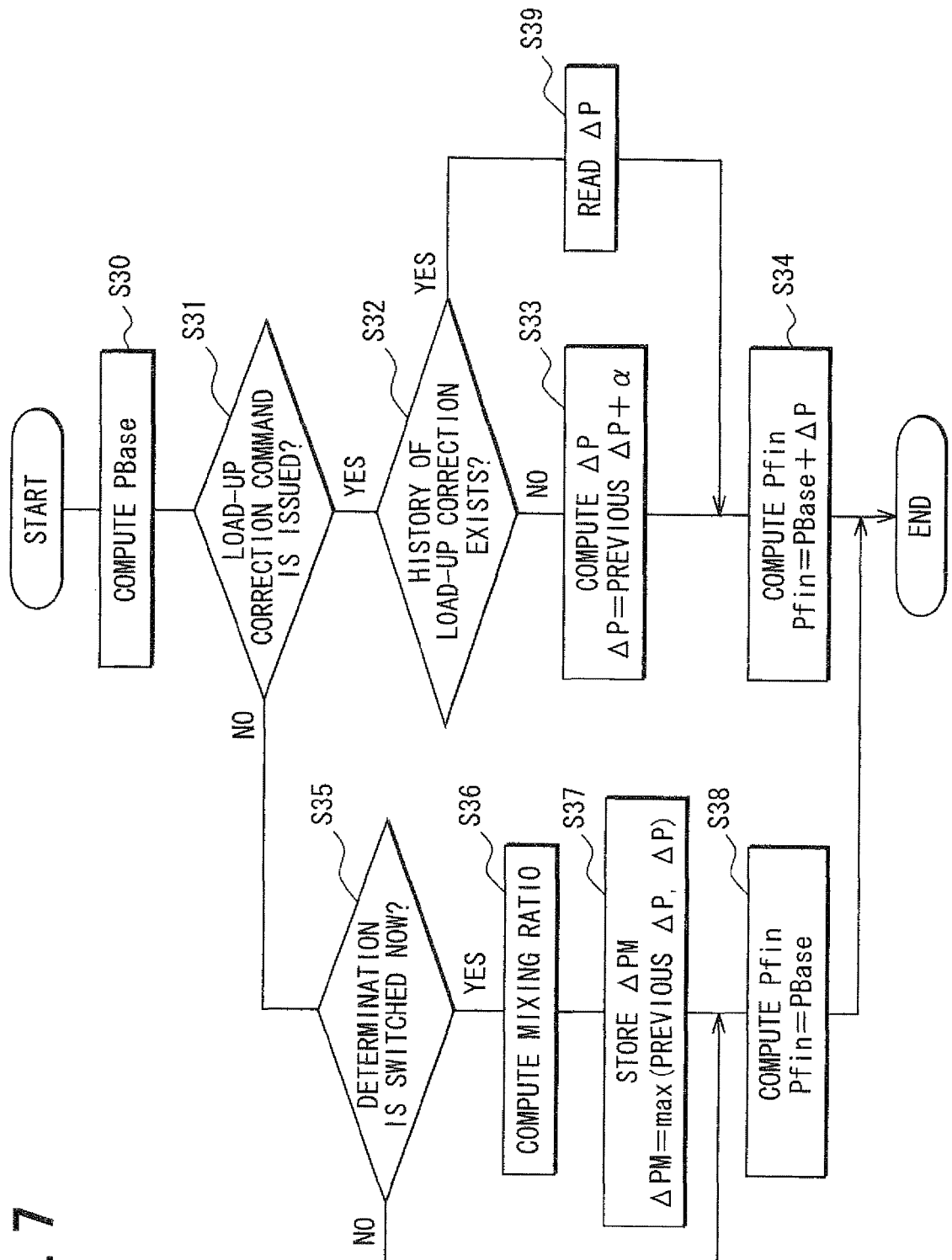
FIG. 7 is a flowchart showing a pump control routine

FIGS. 6 and 7 are flowcharts showing the control procedure of the fuel pump 19a according to the present embodiment and the same codes are named to the steps of the same processes as shown in FIGS. 2 and 3 and the same explanations are used. Further, in the present embodiment, a fuel pressure sensor 19d to detect the fuel pressure in the delivery pipe 19b (refer to the dashed-dotted line in FIG. 1) is disposed. The other parts of the configuration are the same as the first embodiment. The signals detected with the fuel pressure sensor 19d are input into the ECU 40.

Then as shown in FIG. 6, when it is positively determined that the requested injection time InjT exceeds the injectable time InjMax at Step S16, the procedure proceeds to Step S171 and correction command is issued so as to set the target fuel pressure at a high value conforming to load-up operation. On the other hand, when negative determination is given at Step S16, the procedure proceeds to Step S181 and whether the target fuel pressure is the ordinary value is determined. When it is determined that the target fuel pressure is not the ordinary value (NO at Step S181), correction command is issued so that the target fuel pressure may return to the ordinary value from the high value at the succeeding Step S191.

In the processes shown in FIG. 7, at Step S30, the basic target fuel pressure PBase of the fuel pump 19a is computed. Successively at Step S31 it is determined whether the correction command of load-up at Step S171 is issued on the basis of a flag.

When it is determined that the load-up correction command exists at Step S31, at the succeeding Step S32, it is determined whether the history of the load-up correction exists. When it is determined that the load-up correction history does not exist, the procedure proceeds to Step S33 in which the increment ΔP of the target fuel pressure is computed on the basis of the following computation formula;

ΔP=Previous ΔP+β wherein the value β is fixed to a predetermined value.

At Step S34, the final target fuel pressure Pfin is computed on the basis of the following computation formula;

Pfin=Basic target fuel pressure PBase+Increment ΔP

The drive of the fuel pump 19a is controlled so that the fuel pressure may take the final target fuel pressure Pfin.

When it is determined that load-up correction command does not exist at Step S31, the procedure proceeds to Step S35 in which it is determined whether the determination at Step S31 is now switched from positive determination to negative determination. When it is determined that the determination is now switched, the mixing ratio of gasoline to an alcohol fuel is computed with a graph at Step S36. The graph is prepared by storing beforehand the relationship between the increment ΔP of the target fuel pressure and the mixing ratio. The mixing ratio is computed so that the mixing ratio of the alcohol fuel may increase as the increment ΔP increases.

At Step S37, the increment ΔP and the previous increment ΔP are compared with each other and the larger value of them is stored in a backup RAM as a history increment ΔPM. The history increment ΔPM thus stored is erased when an ignition switch is turned off. Otherwise, the history increment ΔPM may be set so as to be erased when a fuel is fed to the fuel tank 19T. Still otherwise, a history correction quantity ΔTHM may be stored and maintained without being erased.

Whether a fuel is supplied may be determined on the basis of signals output from a detector 38 to detect the opening and closing of a refueling cap (refer to FIG. 1) or signals output from a detector to detect the residual quantity of the fuel in the fuel tank.

At Step S38, the final target fuel pressure Pfin is used as the basic target fuel pressure PBase. If it is determined that the determination is not switched now at Step S35 the procedure proceeds to Step S38 without the computation of the mixing ratio at Step S36 and the process of adopting the final target fuel pressure Pfin as the basic target fuel pressure PBase is executed.

When the history is stored at Step S37, it is determined that the history of load-up correction exists at Step S32 and on this occasion the stored history increment ΔPM is set as the increment ΔP at Step S39. That is, when the determination is once switched from the determination that load-up correction command exists to the determination that load-up correction command does not exist (YES at Step S35), the history increment ΔPM at the time is computed (Step S36) and stored (Step S37). When the load-up correction command exists afterward (YES at Step S32), the basic target fuel pressure PBase is increased by the value of the stored history deviation ΔPM without the computation of the increment ΔP (Step S34).

Successively, an embodiment by the processes shown in FIGS. 6 and 7 is explained. The present embodiment, when compared with the embodiment shown in FIGS. 2 and 3, can be regarded as the same embodiment as shown in FIGS. 5A and 5B if the duty ratio in FIG. 50 is interpreted as the target fuel pressure P. Also in the present embodiment, the fuel pressure in the delivery pipe 19b does not increase even when the target fuel pressure Pfin further increases at the time t2 when the final target fuel pressure Pfin increases and the duty ratio reaches 100%.

The following advantages are obtained also in the present embodiment described above in the same way as the aforementioned first embodiment.

(1) When the requested injection time InjT exceeds the maximum injectable time InjMax, the target fuel pressure Pfin in the fuel pump 19a is increased and thereby load-up operation is adopted. Consequently, the fuel pressure in the delivery pipe 19b increases. As a result, the fuel quantity injected per unit time from the fuel injector 19 also increases and hence the fuel quantity injected during the injectable time increases even when the maximum injectable time InjMax is not changed. As a result, it is possible to reduce the frequency of the undesirable cases where a fuel of a quantity that gives an optimum air-fuel ratio to a requested intake air flow rate responding to the accelerator stroke can more hardly be injected as the quantity of an alcohol fuel blended with gasoline increases. It is suppressed that the air-fuel ratio deviates from the optimum value toward the side of a lean air-flow ratio.

(2) In the case of lean burn combustion, because the combustion state is destabilized, it is concerned that HC and $O_2$ flowing in the catalyst 31 increase and are combusted in the vicinity of the catalyst 31 and resultantly the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(3) During the time period when the requested injection time InjT exceeds the maximum injectable time InjMax (t1 to t3), the load-up operation of the fuel pump 19a continues and hence the air-fuel ratio can come close to the target air-fuel ratio (for example the stoichiometric air-fuel ratio).

(4) The mixing ratio that is the ratio of gasoline to an alcohol fuel is computed on the basis of the history increment ΔPM that is the maximum value of the increment ΔP (the load-up quantity) of the target fuel pressure. Consequently, it is possible to is compute (estimate) the mixing ratio of the gasoline to the alcohol fuel without an alcohol concentration sensor to detect the concentration of an alcohol fuel or the like.

Third Embodiment

In the present embodiment, a device that can change a threshold value functioning as a relief pressure is employed as the pressure regulator 19c (a relief valve) shown in FIG. 1 and it is possible to set the threshold value. Then a means for raising the threshold value is employed in place of a means for raising the target fuel pressure P in the event of the aforementioned load-up operation. Also by this means, it is possible to obtain effects similar to those in the above embodiments. Further, it is possible to estimate a load-up quantity on the basis of the raised threshold value and the time and compute a mixing ratio on the basis of the estimated load-up quantity.

Further, as a modified example of the above configuration, it is also possible to: employ a pressure regulator 19c wherein a threshold value functioning as a relief pressure is fixed; and alternately use two pressure regulators 11c having threshold values different from each other. On this occasion, the pressure regulators 19c may be switched to the pressure regulator 19c having a higher relief pressure when the aforementioned load-up operation is executed. Also by this means, it is possible to obtain effects similar to those in the above embodiments. Further, it is possible to estimate the load-up quantity on the basis of the raised threshold value and the time and compute a mixing ratio on the basis of the estimated load-up quantity.

Fourth Embodiment

Figure 8:
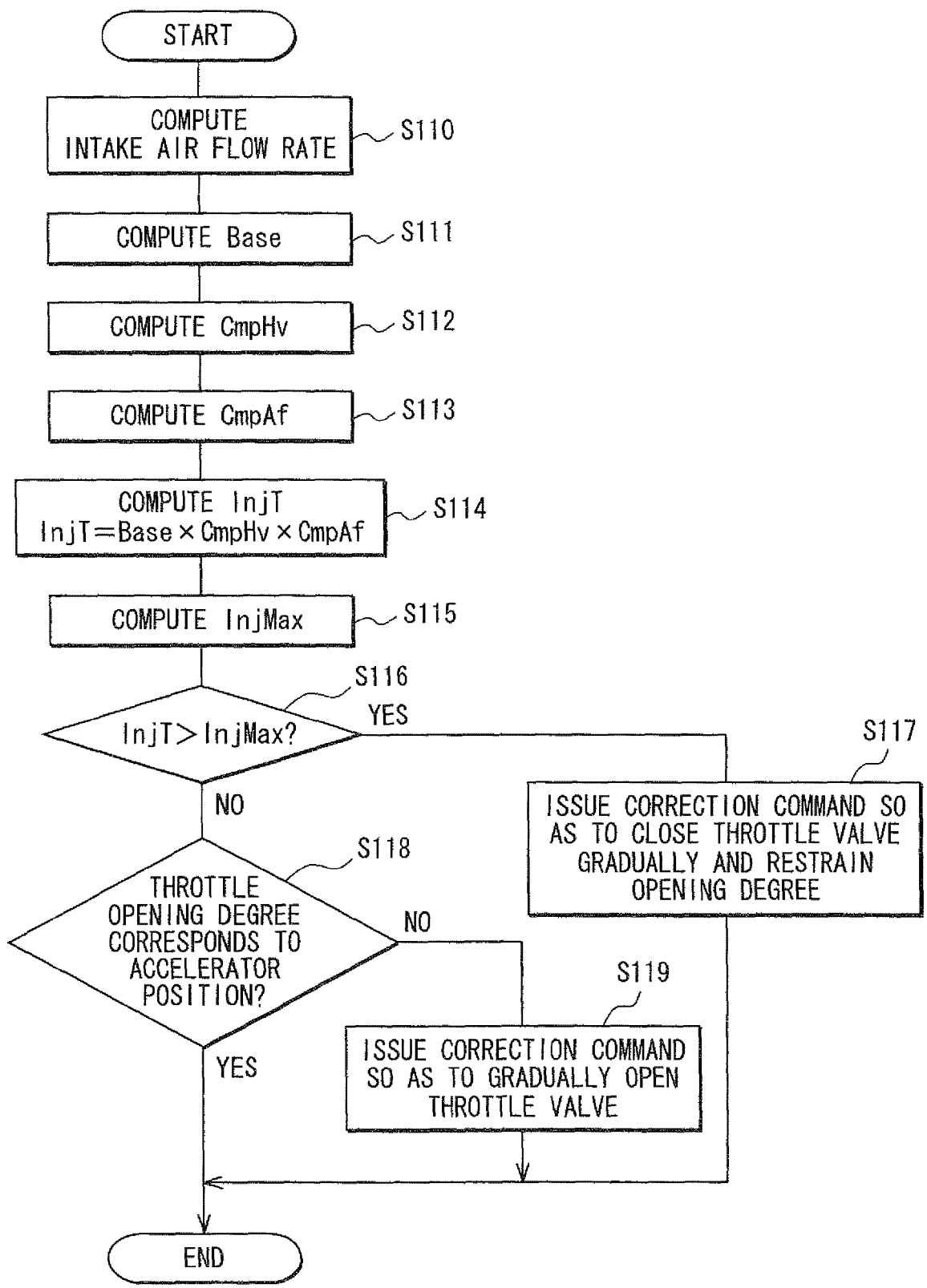
FIG. 8 is a flowchart showing the control procedure.
Figure 9:
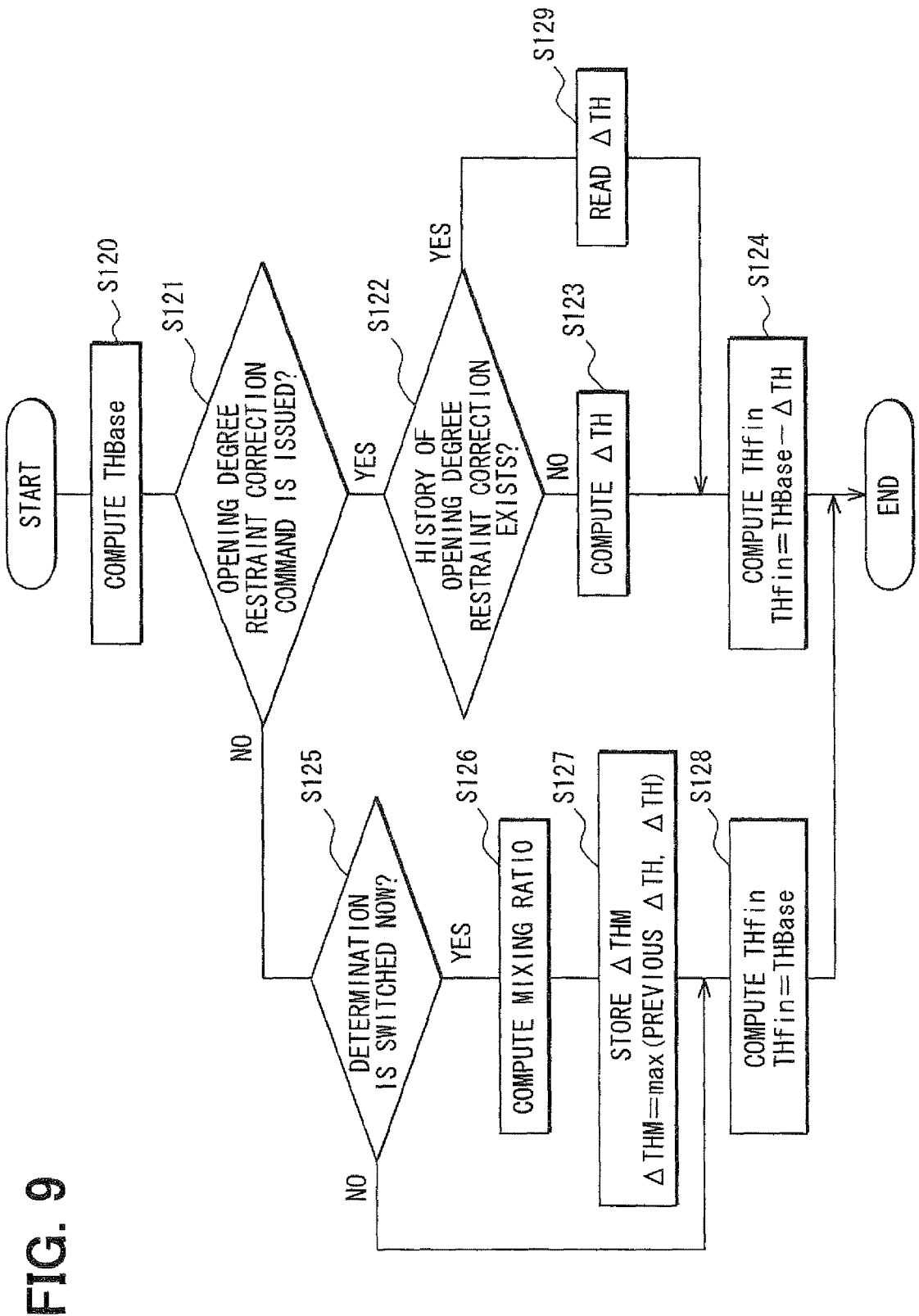
FIG. 9 is a flowchart showing a throttle control routine.

The control procedure of the throttle actuator 15 with the ECU 40 is explained on the basis of the flowcharts shown in FIGS. 8 and 9.

At Step S110 in FIG. 8, an actual intake airflow rate is computed on the basis of a value measured with the air flow meter 13. Successively, at Step S111, a basic fuel time Base per cylinder is computed on the basis of the computed intake air flow rate. The basic fuel time Base is computed so as to increase as the intake air flow rate increases.

Successively at Step S112, a fuel increment CmpHv is computed on the basis of: an engine speed computed on the basis of signals output from the crank angle sensor 35; and an intake air pressure computed by the intake air pressure sensor 17. The fuel increment CmpHv is computed so as to increase as the engine speed and the intake air pressure increase.

Successively at Step S113, a fuel correction value CmpAf is computed on the basis of the deviation (an actual air-fuel ratio minus a target air-fuel ratio) between an actual air-fuel ratio measured by the A/F sensor 32 and a target air-fuel ratio. The fuel correction value CmpAf is computed so as to be a larger value as the deviation increases and is a correction value used for bringing an actual air-fuel ratio close to a target air-fuel ratio.

Successively at Step S114, a requested injection time InjT of a fuel injected per one cylinder is computed on the basis of the following computation formula;

$InjT$=Basic fuel time Base×Fuel increment $CmpHv$× Fuel correction value $CmpAf$ By opening the fuel injector 19 for a requested injection time InjT, the pressure in the delivery pipe 19b is maintained at a prescribed value and hence a fuel in the quantity responding to the requested injection time InjT is injected from the fuel injector 19. Then the basic fuel time Base is computed at Step S111 on the premise that a fuel in the quantity responding to the requested injection time InjT is injected during one combustion cycle.

At Step S115, a maximum injectable time InjMax is computed on the basis of an engine speed. In the present embodiment, 700° CA in one combustion cycle of 720° CA is set as the maximum injectable crank angle and the time spent while a crank shaft rotates by 700° CA is the maximum injectable time InjMax.

At Step S116, whether the requested injection time InjT is larger than the injectable time InjMax is determined. If it is positively determined that InjT is larger than InjMax, the injection quantity is in an insufficient state and it is concerned that the actual air-fuel ratio deviates from the target air-fuel ratio toward the side of a lean air-fuel ratio. In order to avoid the concern when the positive determination is made, the procedure proceeds to Step S117 and the throttle opening degree is reduced forcibly, thus the actual intake air flow rate is also reduced. At Step S117, correction command is issued so as to gradually close the throttle valve and restrain the opening degree. More specifically a flag of opening degree restraint correction command is placed. Then, when such opening degree restraint correction command is issued, the throttle opening degree decreases in the throttle control routine in FIG. 9.

When negative determination is made at Step S116, the procedure proceeds to Step S118 in which it is determined whether the throttle opening degree corresponds to an accelerator stroke (a requested intake air flow rate). When it is determined that the throttle opening degree is not a degree corresponding to a requested intake air flow rate, correction command is issued so that the throttle valve 14 may gradually open and return from the restrained opening degree to an opening degree corresponding to a requested intake air flow rate at the succeeding Step S119. More specifically, a flag of requested opening degree return correction command is placed.

FIG. 9 is a flowchart showing the procedure of throttle opening degree control for computing a control value output from the ECU 40 to the throttle actuator 15. At Step S120, the basic requested opening degree THBase of the throttle valve 14 is computed. More specifically, the basic requested opening degree THBase of the throttle valve 14 is computed on the basis of a requested intake air flow rate responding to a stroke of the accelerator manipulated by a driver. Successively at Step S121, whether the opening degree restraint correction command is issued at Step S117 is determined on the basis of the flag.

When it is determined that the opening degree restraint correction command exists, whether the history of opening degree restraint correction exists is determined so at the succeeding Step S122. When it is determined that the opening degree restraint correction history does not exist, at Step S123, the correction quantity ΔTH as the decrement of the throttle opening degree caused by the opening degree restraint is computed on the basis of the following computation formula;

Δ*TH*=Previous Δ*TH*+α wherein, the value α in the computation formula is fixed to a predetermined value.

At Step S124, the final control value THfin output from the ECU 40 to the throttle actuator 15 is computed on the basis of the following computation formula;

*TH*fin=Basic requested opening degree *TH*Base+Correction quantity Δ*TH*.

When it is determined that the opening degree restraint correction command does not exist (NO at Step S121), the procedure proceeds to Step S125 and whether the determination at Step S121 is now switched from positive determination to negative determination is determined. When it is determined that the determination is now switched (YES at Step S125), the mixing ratio that is the ratio of gasoline to an alcohol fuel is computed at Step S126. More specifically, firstly the deviation between the control value THfin as the opening degree after correction and the basic requested opening degree THBase corresponding to an accelerator stroke is computed as the opening degree correction quantity ΔTH. Then a graph showing the relationship between the correction quantity ΔTH and the mixing ratio is stored beforehand and the mixing ratio is computed with the graph on the basis of the correction quantity ΔTH.

At Step S127, the correction quantity ΔTH and the previous correction quantity ΔTH are compared with each other and the larger value of them is stored in a backup RAM as a history correction quantity ΔTHM. Here, the history correction quantity ΔTHM thus stored is erased when an ignition switch is turned off. Otherwise, the history correction quantity ΔTHM may be set so as to be erased when a fuel is fed to the fuel tank 19T. Still otherwise, the history correction quantity ΔTHM may be stored and maintained without being erased.

Whether a fuel is supplied may be determined on the basis of signals output from a detector 38 to detect the opening and closing of a refueling cap (refer to FIG. 1) or signals output from a detection means to detect the residual quantity of the fuel in the fuel tank. In other words, the memory of the history is maintained until the signals output from the detector (canceling signals) are obtained.

At Step S128, the final control value THfin output from the ECU 40 to the throttle actuator 15 is used as the basic requested opening degree THBase. If it is determined that the determination is not switched now at Step S125, the procedure proceeds to Step S128 without the computation of the mixing ratio at Step S126 and the process of adopting the control value THfin as the basic requested opening degree THBase is executed.

When the history is stored at Step S127, it is determined that the history of opening degree restraint correction exists at Step S122 and on this occasion the stored history correction quantity ΔTHM is set as the correction quantity ΔTH at Step S129. That is, when the determination is once switched from the determination that opening degree restraint correction command exists to the determination that opening degree restraint correction command does not exist, the history correction quantity ΔTHM at the time is computed and stored. When the opening degree restraint correction command exists afterward, the basic requested opening degree THBase is decreased by the stored history correction quantity ΔTHM without the computation of the correction quantity ΔTH at Step S123.

Figure 10A:
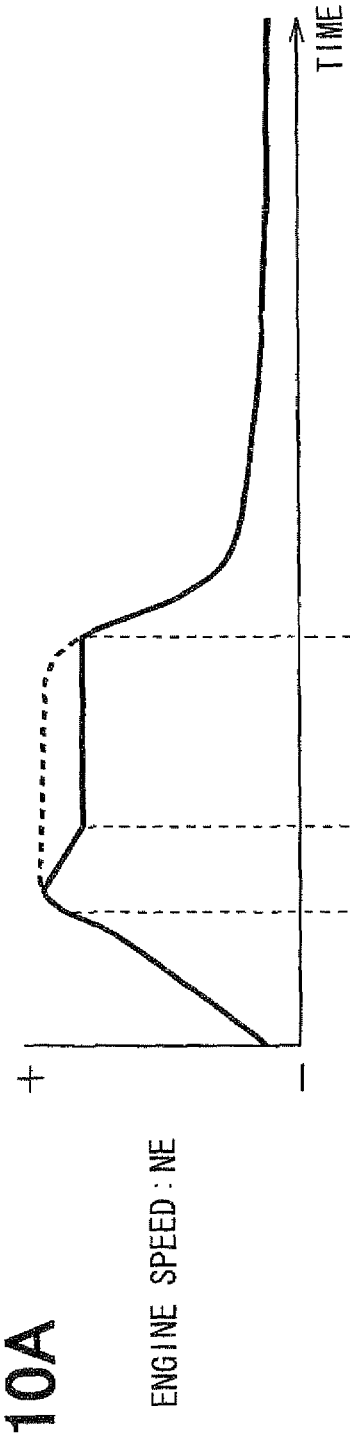
FIG. 10A to 10C are timing charts showing an embodiment according to the procedure shown in FIGS. 8 and 9.
Figure 10B:
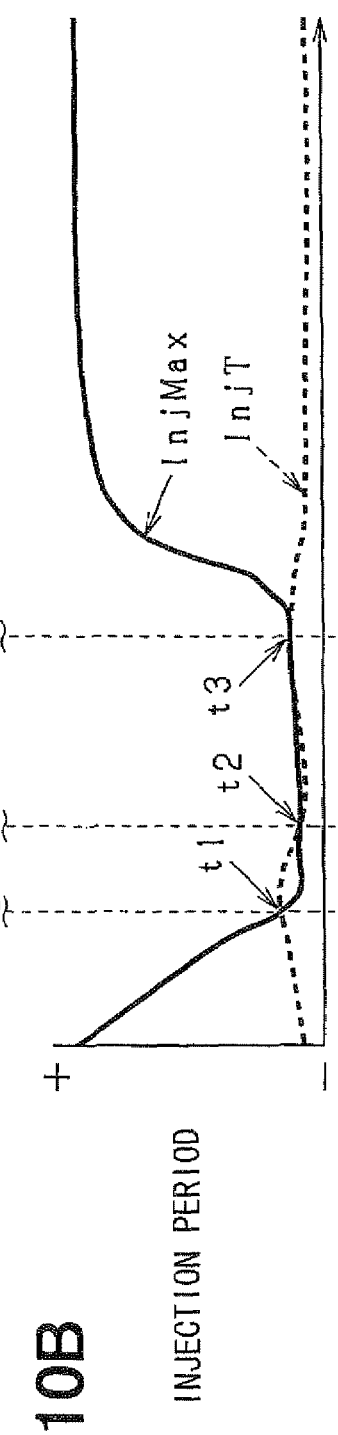
Figure 10C:
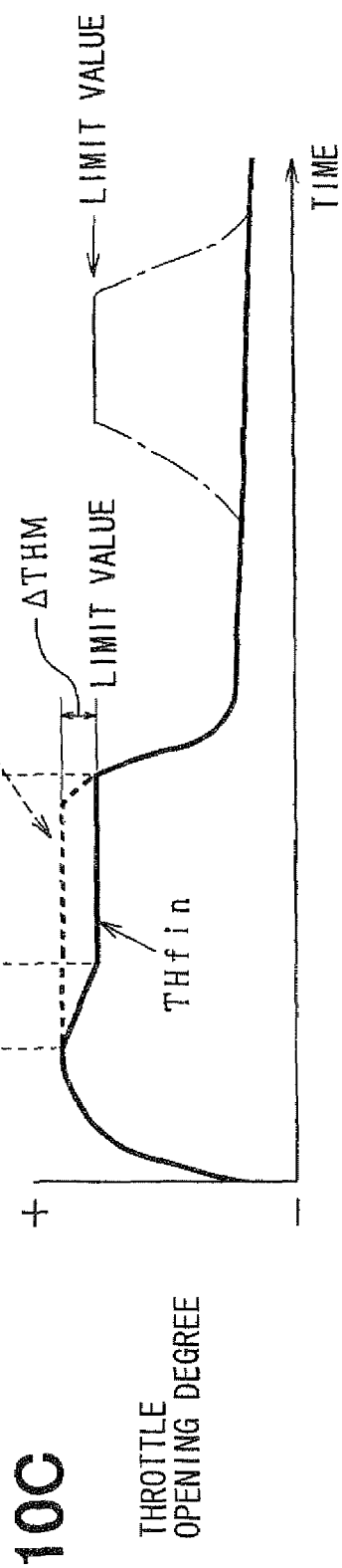

An embodiment in the case where the drive of the fuel pump 19a is controlled on the basis of the determination at Step S116 is shown in FIGS. 10A-10C. FIG. 10A shows the change of the engine speed NE computed on the basis of signals output from the crank angle sensor 35. In FIG. 10B, the solid line shows the change of the maximum injectable time InjMax and the dotted line shows the change of the requested injection time InjT per one cylinder when an alcohol fuel is not blended. FIG. 10C shows the change of the throttle opening degree responding to a control value THfin.

As shown in FIG. 10A-10C, the maximum injectable time InjMax lowers as the engine speed increases due to the increase of the accelerator stroke, and increases as the engine speed decreases. Then, when the maximum injectable time InjMax lowers as the engine speed increases and the time t1 comes, the requested injection time InjT comes to be larger than the maximum injectable time InjMax because an alcohol fuel is blended with gasoline.

At the time of t1, the determination at Step S116 shifts from negative determination to positive determination. Then, as long as the state of the positive determination continues, the control value THfin decreases gradually every time by the value α and the throttle opening degree lowers gradually. Then the actual intake air flow rate decreases and the actual air-fuel ratio comes close to the target air-fuel ratio accordingly. Consequently, the fuel correction value CmpAf at Step S113 decreases and the requested injection time InjT decreases. As a result, the determination at Step S116 shifts from positive determination to negative determination and the control value THfin maintains a balanced value so that the expression "InjT=InjMax" may be satisfied. Such a balanced state continues from the time t2 to the time t3.

Thereafter, when the maximum injectable time InjMax increases as the engine speed lowers due to the decrease of the accelerator stroke and the time t3 comes, the requested injection time InjT comes to be smaller than the maximum injectable time InjMax and the determination at Step S116 continues to be negative determination.

Successively, when the requested injection time InjT exceeds the maximum injectable time InjMax again because of the increase of the accelerator stroke or the like, the throttle opening degree lowers and restrained so as to take the value of the stored history correction quantity ΔTHM as shown by the dashed-dotted line in FIG. 10C.

The following excellent advantages are obtained in the present embodiment described above.

(1) When the requested injection time InjT exceeds the maximum injectable time InjMax because an alcohol fuel is blended with gasoline, the throttle opening degree is lowered and restricted. Consequently, the actual intake air flow rate comes to be lower than the requested intake air flow rate computed in accordance with an accelerator stroke. As a result, it is possible to suppress the drawback in that the actual air-fuel ratio deviates from the target air-fuel ratio (for example the stoichiometric air-fuel ratio) toward the side of a lean air-fuel ratio even in the undesirable cases where a fuel of a quantity that gives an optimum air-fuel ratio to a requested intake air flow rate responding to the accelerator stroke cannot be injected as the quantity of an alcohol fuel is blended with gasoline increases.

(2) In the case of lean burn caused by a lean air-fuel ratio, because the combustion state is destabilized, it is concerned that HC and $O_2$ flowing in the catalyst 31 increase and are combusted in the vicinity of the catalyst 31 and resultantly the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(3) When the determination is once switched from the determination that opening degree restraint correction command exists to the determination that opening degree restraint correction command does not exist, the history correction quantity ΔTHM at the time is stored. Thereafter, when the opening degree restraint correction command exists afterward, the basic requested opening degree THBase is decreased by the stored history correction quantity ΔTHM without the computation of the correction quantity ΔTH at Step S123. Consequently, the state of degeneracy operation wherein the actual intake air flow rate is smaller than the requested intake air flow rate responding to an accelerator stroke continues. Then, since the degeneracy operation state is an operation state where an output torque corresponding to an accelerator stroke is not obtained, it is possible to make a driver who manipulates an accelerator pedal realize abnormality.

(4) During the time period when the requested injection time InjT exceeds the maximum injectable time InjMax (t1 to t2 and t3), the correction for reducing and restricting the throttle opening degree continues and hence the actual air-fuel ratio can come close to the target air-fuel ratio (for example the stoichiometric air-fuel ratio).

(5) The mixing ratio of gasoline to an alcohol fuel is computed on the basis of the history correction quantity ΔTHM that is the maximum value of the correction quantity ΔTH (the magnitude of correction) that is the deviation between the control value THfin as the opening degree after correction and the basic requested opening degree THBase corresponding to an accelerator stroke. Consequently, it is possible to compute (estimate) the mixing ratio of the gasoline to the alcohol fuel without an alcohol concentration sensor to detect the concentration of an alcohol fuel or the like.

Fifth Embodiment

In the present embodiment, when the engine speed exceeds the upper limit NEL, overrun fuel cutting control for fully closing the throttle opening, cutting the injection of a fuel from the fuel injector 19, and thus reducing the engine output (refer to Step S141 in FIG. 12) is executed. Meanwhile, in the aforementioned fourth embodiment, the intake air flow rate is reduced by applying opening degree restraint correction to reduce the throttle opening degree and the determination at Step S116 is prevented from being switched to positive determination by reducing the requested injection time InjT. In contrast, in the present embodiment, the upper limit NEL used in the overrun fuel cutting control is lowered, thereby the requested injection time InjT is reduced, and resultantly the determination at Step S116 is prevented from being switched to positive determination.

Figure 11:
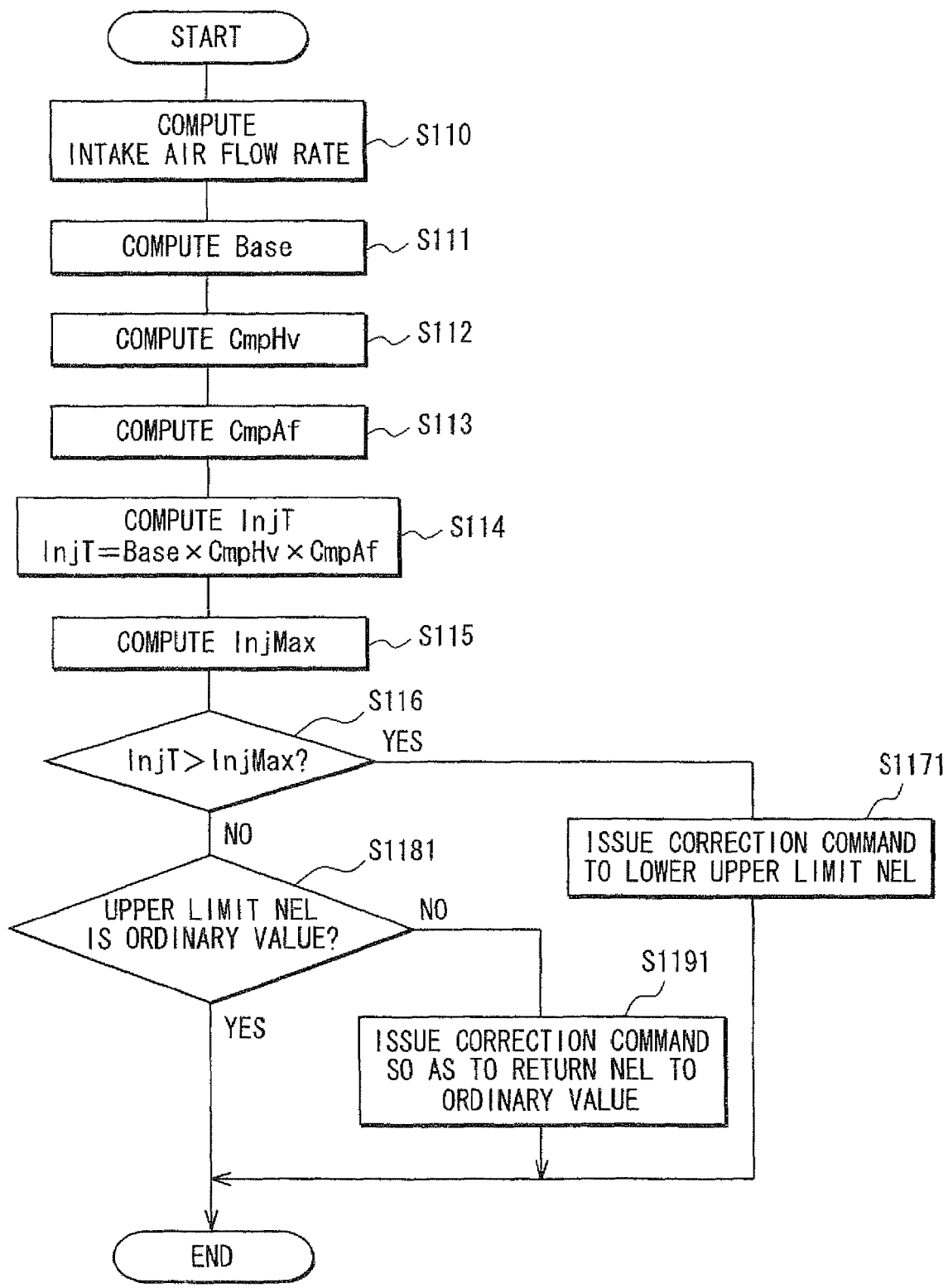
FIG. 11 is a flowchart showing the control procedure according to a fifth embodiment.
Figure 12:
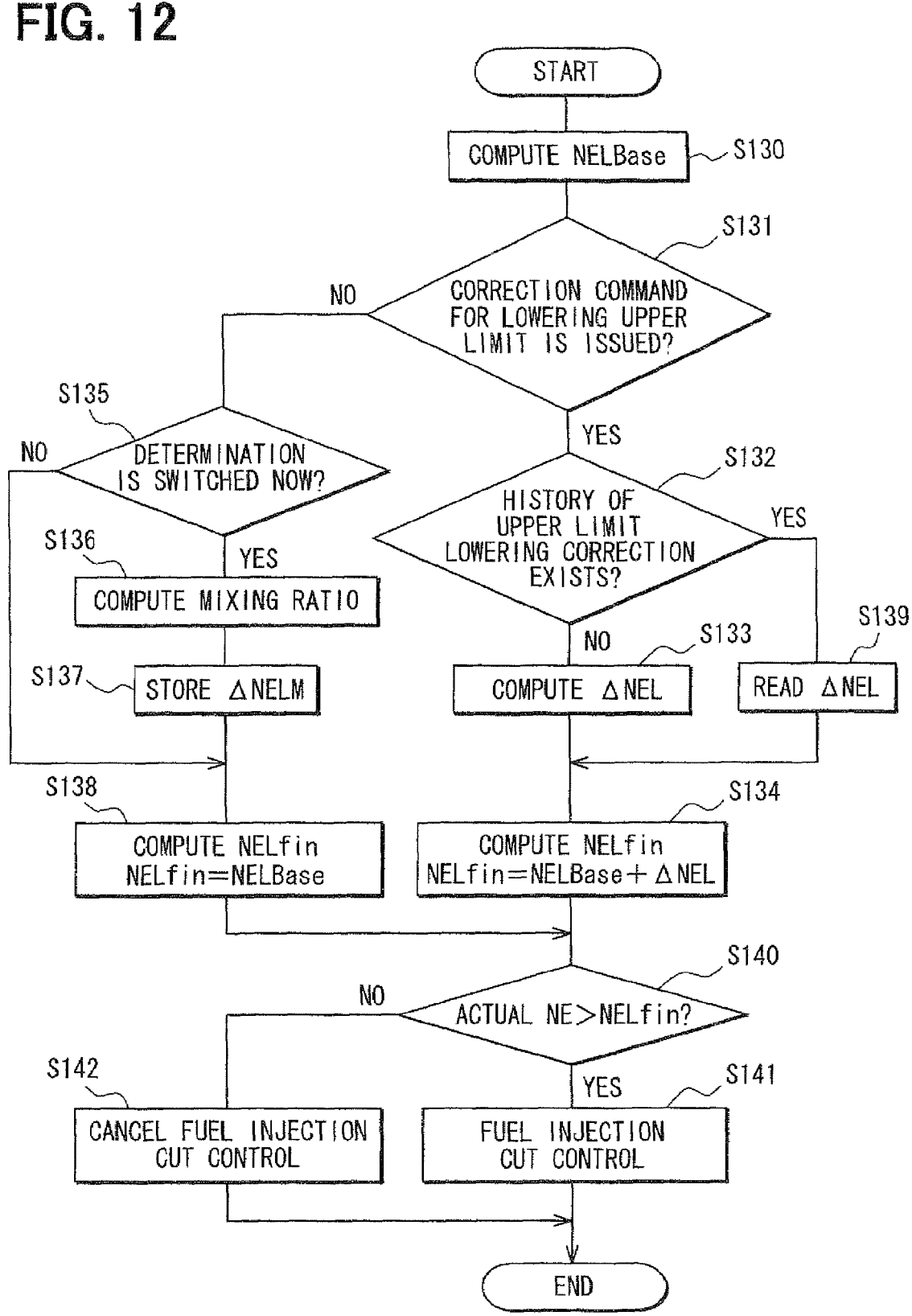
FIG. 12 is a flowchart showing a pump control routine.

FIGS. 11 and 12 are flowcharts showing the procedure of the fuel injector 19 according to the present embodiment and the same codes are named to the steps of the same processes as shown in FIGS. 8 and 9 and the same explanations are used. Further, the configuration of the present embodiment is the same as the fourth embodiment.

As shown in FIG. 11, when it is positively determined that the requested injection time InjT exceeds the injectable time InjMax at Step S116, the procedure proceeds to Step S1171 and correction command is issued so as to lower the upper limit NEL used in the overrun fuel cutting control. On the other hand, when the determination is negative at Step S116, the procedure proceeds to Step S1181 and whether the upper limit NEL is the ordinary value is determined. When it is determined that the upper limit NEL is not the ordinary value, correction command is issued so as to return the upper limit NEL to the ordinary value at the succeeding Step S1191.

In the process shown in FIG. 12, at Step S130, an ordinary upper limit NELBase (an ordinary value) is read out. Successively at Step S131, whether the correction command for lowering the upper limit is issued at Step S1171 is determined on the basis of a flag.

When it is determined that the upper limit lowering correction command exists, whether the history of the upper limit lowering correction exists is determined at the succeeding Step S132. When it is determined that the upper limit lowering correction history does not exist, at Step S133, the decrement ΔNEL of the upper limit NEL is computed on the basis of the following computation formula;

$$\Delta NEL = \text{Previous } \Delta NEL - \beta$$

wherein, the value β is fixed to a predetermined value.

At the succeeding Step S134, the final upper limit NELfin is computed on the basis of the following computation formula;

$$P\text{fin} = \text{Ordinary upper limit } NEL\text{Base} - \text{Decrement } \Delta NEL.$$

The fuel injector 19 is controlled so that the upper limit may come to the final upper limit NELfin.

When it is determined that the upper limit lowering correction command does not exist, the procedure proceeds to Step S135 and whether the determination at Step S131 is now switched from positive determination to negative determination is determined. When it is determined that the determination is now switched, the mixing ratio of gasoline to an alcohol fuel is computed with a graph at Step S136. The graph used here is prepared by storing beforehand the relationship between the decrement ΔNEL of the upper limit NEL and the mixing ratio. The mixing ratio is computed so that the mixing ratio of the alcohol fuel may increase as the decrement ΔNEL increases.

At Step S137, the decrement ΔNEL and the previous decrement ΔNEL are compared with each other and the larger value of them is stored as a history decrement ΔNELM. The history decrement ΔNELM thus stored is erased when an ignition switch is turned off. Otherwise, the history decrement $\Delta$NELM may be set so as to be erased when a fuel is fed to the fuel tank 19T. Still otherwise, the history decrement $\Delta$NELM may be stored and maintained without being erased.

Whether a fuel is supplied may be determined on the basis of signals output from a detector 38 to detect the opening and closing of a refueling cap (refer to FIG. 1) or signals output from a detector to detect the residual quantity of the fuel in the fuel tank.

At Step S138, the final upper limit NELfin is used as the ordinary upper limit NELBase. When it is determined that the determination is not switched now at Step S135, the procedure proceeds to Step S138 without the computation of the mixing ratio at Step S136 and the process of adopting the final upper limit NELfin as the ordinary upper limit NELBase is executed When the history is stored at Step S137, it is determined that the history of upper limit lowering correction exists at Step S132 and on this occasion the stored history decrement $\Delta$NELM is set as the decrement $\Delta$NEL at Step S139. That is, when the determination is once switched from the determination that upper limit lowering correction command exists to the determination that upper limit lowering correction command does not exist, the history decrement $\Delta$NELM at the time is computed and stored. When the upper limit lowering correction command exists afterward, the ordinary upper limit NELBase is decreased by the stored history decrement $\Delta$NELM without the computation of the decrement $\Delta$NEL at Step S133.

At Step S140, the actual engine speed NE and the final upper limit NELfin are compared with each other. When it is determined that the expression NE>NELfin is satisfied, fuel injection cutting control is executed at Step S141. When it is determined that the expression NE>NELfin is not satisfied, the fuel injection cutting control is cancelled and the fuel injector 19 is controlled on the basis of the requested injection time InjT.

Figure 13A:
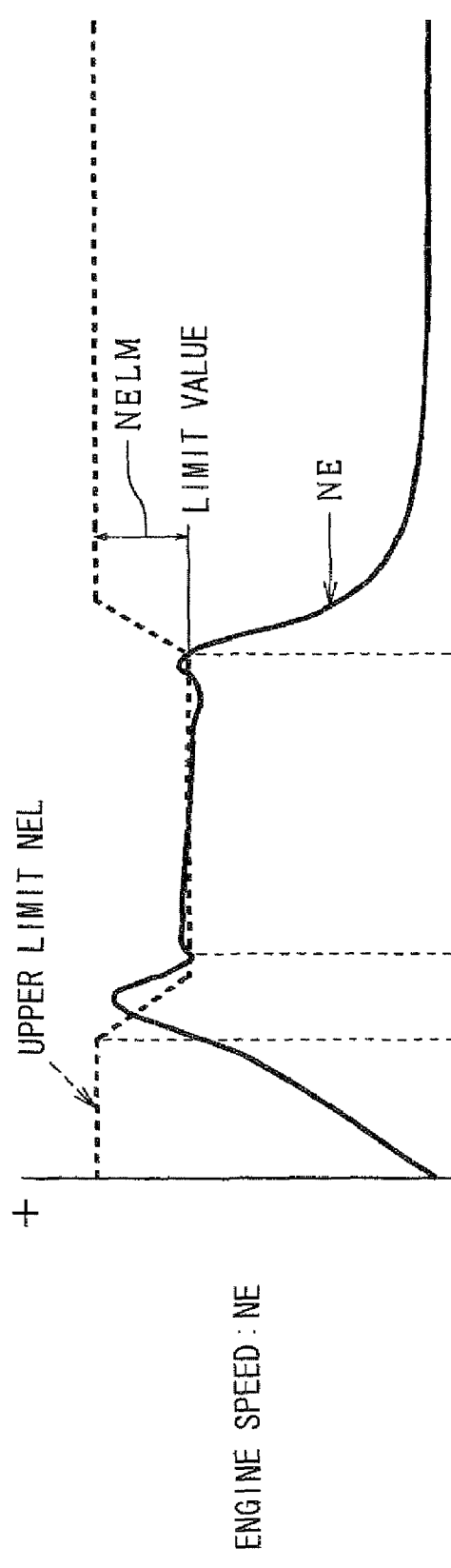
FIGS. 13A and 13B are timing charts showing an embodiment according to the procedure shown in FIGS. 11 and 12.
Figure 13B:
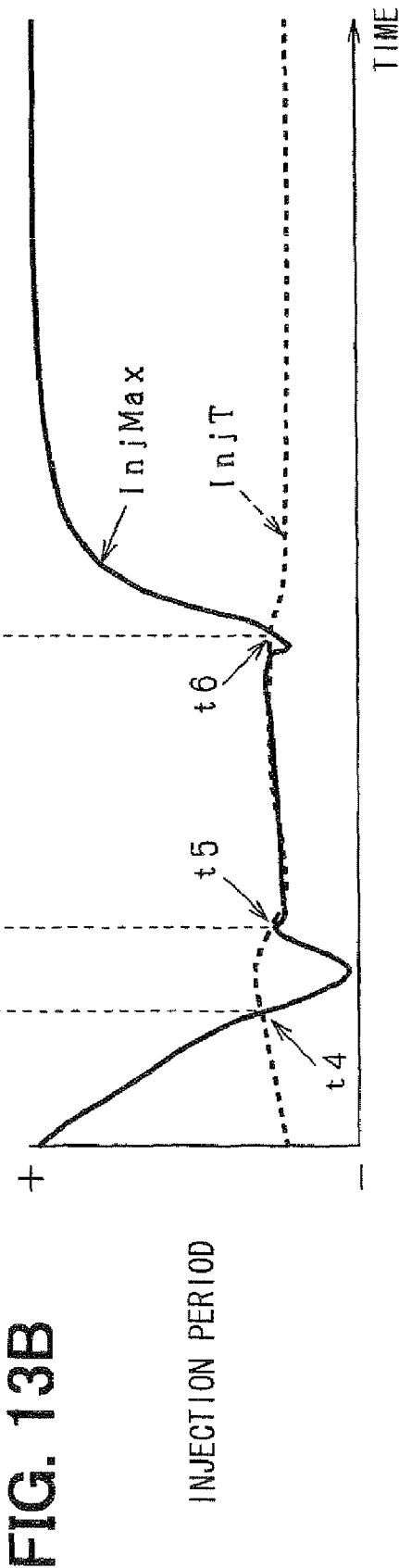

An embodiment according to the processes shown in FIGS. 11 and 12 is hereunder explained in reference to FIGS. 13A and 13B. The dotted line in FIG. 13A shows the change of the upper limit NEL of overrun fuel cutting control and the solid line shows the change of the engine speed NE. The solid line in FIG. 13B shows the change of the maximum injectable time InjMax and the dotted line shows the change of the requested injection time InjT per one cylinder when an alcohol fuel is not blended.

As shown in FIGS. 13A and 13B, the maximum injectable time InjMax lowers as the engine speed increases due to the increase of the accelerator stroke, and increases as the engine speed decreases. Then, when the maximum injectable time InjMax lowers as the engine speed increases and the time t4 comes, the requested injection time InjT comes to be larger than the maximum injectable time InjMax because an alcohol fuel is blended with gasoline.

At the time of t4, the determination at Step S116 shifts from negative determination to positive determination. Then, as long as the state of the positive determination continues, the upper limit NELfin decreases gradually every time by the value $\beta$ and the upper limit NEL lowers gradually. Then the maximum injectable time InjMax increases as the engine speed NE lowers due to the fuel injection cutting control. As a result, the determination at Step S116 shifts from positive determination to negative determination and the final upper limit NELfin maintains a balanced value so that the expression InjT=InjMax may be satisfied. Such a balanced state continues from the time t5 to the time t6.

Thereafter, when the maximum injectable time InjMax increases as the engine speed NE lowers due to the decrease of the accelerator stroke and the time t6 comes, the requested injection time InjT comes to be smaller than the maximum injectable time InjMax and the determination at Step S116 continues to be negative determination.

Successively, when the requested injection time InjT exceeds the maximum injectable time InjMax again because of the increase of the accelerator stroke or the like, the upper limit NEL lowers and restrained so as to take the value of the stored history decrement $\Delta$NELM.

The following advantages are obtained also in the present embodiment described above in the same way as the aforementioned fourth embodiment.

(1) When the requested injection time InjT exceeds the maximum injectable time InjMax, the final upper limit NELfin of the fuel injection cutting control is lowered. Consequently, the frequency of the cases where the engine speed NE increases to a high speed exceeding the upper limit NEL reduces and hence the frequency of the cases where the maximum injectable time InjMax shortens to the extent that the positive determination is made also reduces. As a result, it is possible to suppress the drawback in that the air-fuel ratio deviates from the optimum value toward the side of a lean air-fuel ratio even in the undesirable cases where a fuel of a quantity that gives an optimum air-fuel ratio to a requested intake air flow rate responding to the accelerator stroke cannot be injected as the quantity of an alternate fuel such as an alcohol fuel blended with a regular fuel such as gasoline increases.

(2) In the case of lean burn caused by a lean air-fuel ratio, because the combustion state is destabilized, it is concerned that HC and $O_2$ flowing in the catalyst 31 increase and are combusted in the vicinity of the catalyst 31 and resultantly the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(3) When the determination is once switched from the determination that upper limit lowering correction command exists to the determination that upper limit lowering correction command does not exist, the history decrement $\Delta$NELM at the time is stored. Thereafter, when the upper limit lowering correction command exists afterward, the ordinary upper limit NELBase is decreased by the stored history decrement $\Delta$NELM without the computation of the decrement $\Delta$NEL at Step S133. Consequently, the state of degeneracy operation wherein the actual intake air flow rate is smaller than the requested intake air flow rate responding to an accelerator stroke continues. Then, since the degeneracy operation state is an operation state where an output torque corresponding to an accelerator stroke is not obtained, it is possible to make a driver who manipulates an accelerator pedal realize abnormality.

(4) During the time period when the requested injection time InjT exceeds the maximum injectable time InjMax (t4 to t5 and t6), the overrun fuel cutting control continues and hence the air-fuel ratio can come close to the target air-fuel ratio (for example the stoichiometric air-fuel ratio).

(5) The mixing ratio of gasoline to an alcohol fuel is computed on the basis of the history decrement $\Delta$NELM that is the maximum value of the decrement $\Delta$NEL (the magnitude of correction) of the upper limit NEL. Consequently, it is possible to compute (estimate) the mixing ratio of the gasoline to the alcohol fuel without an alcohol concentration sensor or the like to detect the concentration of an alcohol fuel.

Although the throttle opening degree is on the fully closed side and the fuel injection is cut at Step S141 in the above fifth embodiment, the overrun control means according to the present invention is not limited to such fully closed and cut case. Then for example, it is also possible to restrain the throttle opening degree so as to be kept at a prescribed level or lower and also the fuel injection quantity so as to be kept at a prescribed level or lower.

Other Embodiments

The present invention is not limited to the contents described in the aforementioned embodiments and may be modified as stated below. Further, the specific structural features of each of the embodiments may arbitrarily be combined with each other.

Although a spark ignition internal combustion engine such as a gasoline engine is intended as the internal combustion engine in the above embodiments, a compression ignition internal combustion engine such as a diesel engine may also be intended.

Although a port injection type engine 10 wherein a fuel injector 19 is attached to an intake manifold 18 or an intake pipe is intended in the above embodiments, a direct fuel-injection engine 10 wherein a fuel injector 19 is attached to a cylinder head and a fuel is directly injected into a combustion chamber 23 may be intended.

However, whereas the maximum injectable crank angle of about 700° CA can be secured in the crank angle of 720° CA per one combustion cycle in the case of the port injection type, in the case of a direct fuel-injection type, the maximum injectable crank angle is smaller than the case of the port injection type and hence the requested injection time InjT exceeds the injectable time InjMax even though only a small amount of alcohol fuel is blended. Consequently, it is estimated that the effects of the above embodiments are still exhibited even in the case of a direct fuel-injection engine 10.

It is also possible to determine only whether an alcohol fuel is blended in place of the computation of a mixing ratio at Step S26 in FIG. 3 or Step S36 in FIG. 7. More specifically it may be determined that there is the possibility that an alcohol fuel is blended when it is determined that correction command of load-up is issued at Step S31 (NO at Step S31).

It is also possible to determine only whether an alcohol fuel is blended in place of the computation of a mixing ratio at Step S126 in FIG. 9 or Step S136 in FIG. 12. More specifically, it may be determined that there is the possibility that an alcohol fuel is blended when it is determined that opening degree restraint correction command is issued at Step S121, or otherwise it may be determined that there is the possibility that an alcohol fuel is blended when it is determined that upper limit lowering correction command is issued at Step S131.

The present invention should not be limited to the disclosed embodiment, but may be implemented in other ways without departing from the sprit of the invention.

What is claimed is:

1. A controller for an internal combustion engine, comprising:
    a requested opening degree computation means for computing a requested opening degree of an intake air flow rate control valve based on a requested intake air flow rate responding to variables of an accelerator manipulated by a driver;
    a requested injection time computation means for computing a requested injection time which is necessary for a fuel injector to inject a fuel per one combustion cycle;
    an injectable time computation means for computing an injectable time per one combustion cycle based on a rotation speed of the output shaft of the internal combustion engine;
    a determination means for determining whether the requested injection time is greater than the injectable time; and
    an opening degree correction means for subtractively correcting the requested opening degree when the determination means determines that the requested injection time is greater than the injectable time.

2. A controller according to claim 1, wherein the opening degree correction means subtractively corrects the requested opening degree gradually until the determination by the determination means changes to negative determination after the positive determination is made.

3. A controller according to claim 1, wherein the requested injection time computation means computes the requested injection time so that an actual air-fuel ratio come close to a target air-fuel ratio.

4. A controller according to claim 1, wherein:
    the determination means repeats the determination at a constant frequency; and
    the opening degree is restrained so as not to exceed an opening degree corrected by the opening degree correction means regardless of a determination result by the determination means until a canceling signal is obtained after the positive determination is made.

5. A controller according to claim 4 wherein the canceling signal is outputted when the fuel is fed to a fuel tank.

6. A control system for an internal combustion engine, comprising:
    a requested opening degree computation means for computing a requested opening degree of an intake air flow rate control valve based on a requested intake air flow rate responding to variables of an accelerator manipulated by a driver;
    a requested injection time computation means for computing a requested injection time which is necessary for a fuel injector to inject a fuel per one combustion cycle;
    an injectable time computation means for computing an injectable time per one combustion cycle based on a rotation speed of the output shaft of the internal combustion engine;
    a determination means for determining whether the requested injection time is greater than the injectable time;
    an opening degree correction means for subtractively correcting the requested opening degree when the determination means determines that the requested injection time is greater than the injectable time; and
    at least either one of an intake air flow rate control valve to regulate an intake air flow rate and a fuel injector to inject a fuel.

* * * * *